(12) United States Patent
Little et al.

(10) Patent No.: US 10,218,121 B2
(45) Date of Patent: Feb. 26, 2019

(54) ELECTRICAL CONNECTOR ASSEMBLIES WITH RELEASABLE LATCHING DEVICE

(71) Applicant: FOXCONN INTERCONNECT TECHNOLOGY LIMITED, Grand Cayman (KY)

(72) Inventors: Terrance F. Little, Fullerton, CA (US); Kamyar Khorrami, Orange, CA (US); Yuan Zhang, Rowland-Heights, CA (US)

(73) Assignee: FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 0 days.

(21) Appl. No.: 15/821,824

(22) Filed: Nov. 23, 2017

(65) Prior Publication Data
US 2018/0166827 A1 Jun. 14, 2018

Related U.S. Application Data

(60) Provisional application No. 62/425,627, filed on Nov. 23, 2016.

(51) Int. Cl.
*H01R 13/633* (2006.01)
*H01R 13/627* (2006.01)
*G02B 6/42* (2006.01)
*H01R 13/6582* (2011.01)
*H01R 13/6581* (2011.01)

(52) U.S. Cl.
CPC ....... *H01R 13/6335* (2013.01); *G02B 6/4293* (2013.01); *H01R 13/6275* (2013.01); *H01R 13/6582* (2013.01); *H01R 13/6581* (2013.01)

(58) Field of Classification Search
CPC ............ H01R 13/6335; H01R 13/6275; H01R 13/6581; H01R 13/6271
USPC .......................... 439/352, 345, 347, 350, 358
See application file for complete search history.

(56) References Cited

U.S. PATENT DOCUMENTS

| 5,773,757 | A | * | 6/1998 | Kenney | .................. | H01R 13/60 |
| | | | | | | 174/53 |
| 7,192,296 | B1 | * | 3/2007 | Little | ................. | H01R 13/6275 |
| | | | | | | 439/358 |
| 9,548,565 | B2 | * | 1/2017 | Frahmann | .......... | H01R 13/6275 |
| 2011/0275236 | A1 | * | 11/2011 | Zhu | ...................... | G02B 6/4201 |
| | | | | | | 439/352 |

(Continued)

*Primary Examiner* — Tulsidas C Patel
*Assistant Examiner* — Travis Chambers
(74) *Attorney, Agent, or Firm* — Wei Te Chung; Ming Chieh Chang

(57) ABSTRACT

An electrical cable connector includes a case forming a front receiving cavity, and a rear receiving cavity. An upward room is formed in an upper face of the case. A latch is pivotally mounted in the room with an upward locking hook at a front end thereof in an up-and-down moveable manner. An actuator is engaged with the latch to actuate the latch to be unlatched from the locking hole in the cage via a rearward pulling. An engagement between the latch and the actuator is performed by a latch slot in the latch and a T-shaped lug on the underside of the actuator moving along the latch slot. A curve structure is formed on the latch along a front-to-back direction so as to have the latch to be pivoted during rearward pulling the actuator, thus having the upward locking hook downward moved for unlatching.

13 Claims, 38 Drawing Sheets

(56) References Cited

U.S. PATENT DOCUMENTS

2014/0235091 A1* 8/2014 Wang ................. H01R 13/6275
439/352
2015/0162709 A1* 6/2015 Shen ................ H01R 13/62933
439/352

* cited by examiner

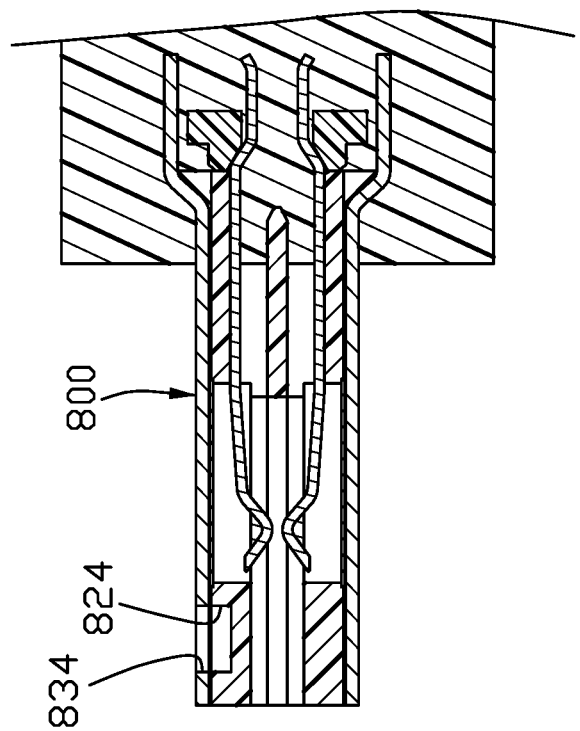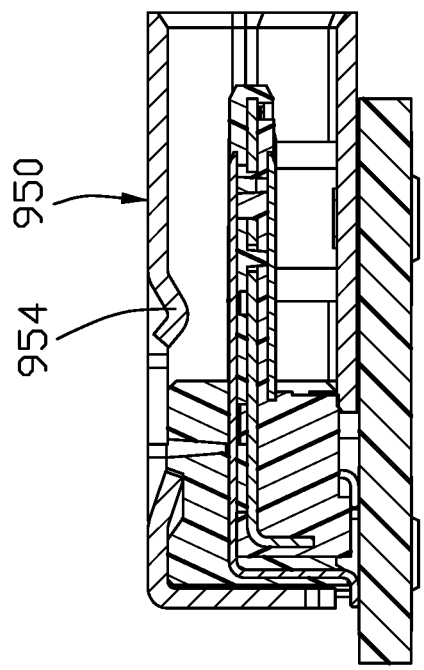
FIG. 23

ELECTRICAL CONNECTOR ASSEMBLIES WITH RELEASABLE LATCHING DEVICE

BACKGROUND OF THE INVENTION

1. Field of the Invention

The present invention relates to an electrical connector assemblies, especially to a releasable latch used with the case of the electrical connector.

2. Description of Related Arts

Latching device is popularly used with the communication cable connector assembly to cooperate with the corresponding latching structure on the metallic cage in which a receptacle connector is disposed. Different latching devices are operated with different orientations to mate with different latching structures on the cage. The instant invention is related to the latching device which is essentially located on a top side of the connector case with an upward locking hook which is up and down moveable in a vertical direction for unlatching via an actuator which is essentially a pulling tab moveable along a front-to-back direction.

SUMMARY OF THE INVENTION

An object of the present invention is to provide an electrical cable connector, which is adapted to mate with a receptacle connector disposed in a metallic cage, with an up and down moveable releasable latch operable by a back and forth moveable actuator, wherein the releasable latch is equipped with an upward locking hook which is adapted to be engaged within a locking hole in a top wall of the metallic cage.

To achieve the above-mentioned object, an electrical cable connector including a case forming a front receiving cavity to receive a printed circuit board therein, and a rear receiving cavity to receive a plurality of wires of a cable. An upward room is formed in an upper face of the case. A latch is pivotally mounted in the room with an upward locking hook at a front end thereof in an up-and-down moveable manner. An actuator is engaged with the latch and moveable along a front-to-back direction so as to actuate the latch to be unlatched from the locking hole in the cage via a rearward pulling. An engagement between the latch and the actuator is performed by a latch slot in the latch and a T-shaped lug on the underside of the actuator moving along the latch slot. A curve structure is formed on the latch along a front-to-back direction so as to have the latch to be pivoted during rearward pulling the actuator, thus having the upward locking hook downward moved for unlatching. The novel features of the invention will become more apparent from the following detailed description when taken in conjunction with the accompanying drawings.

BRIEF DESCRIPTION OF THE DRAWINGS

FIG. 13(B) is an upward further exploded perspective view of the terminal module of the receptacle connector of FIG. 14(B);

FIG. 23 is a cross-sectional view of the cable connector and the receptacle connector of FIG. 21;

DETAILED DESCRIPTION OF THE PREFERRED EMBODIMENT

Figure 1:
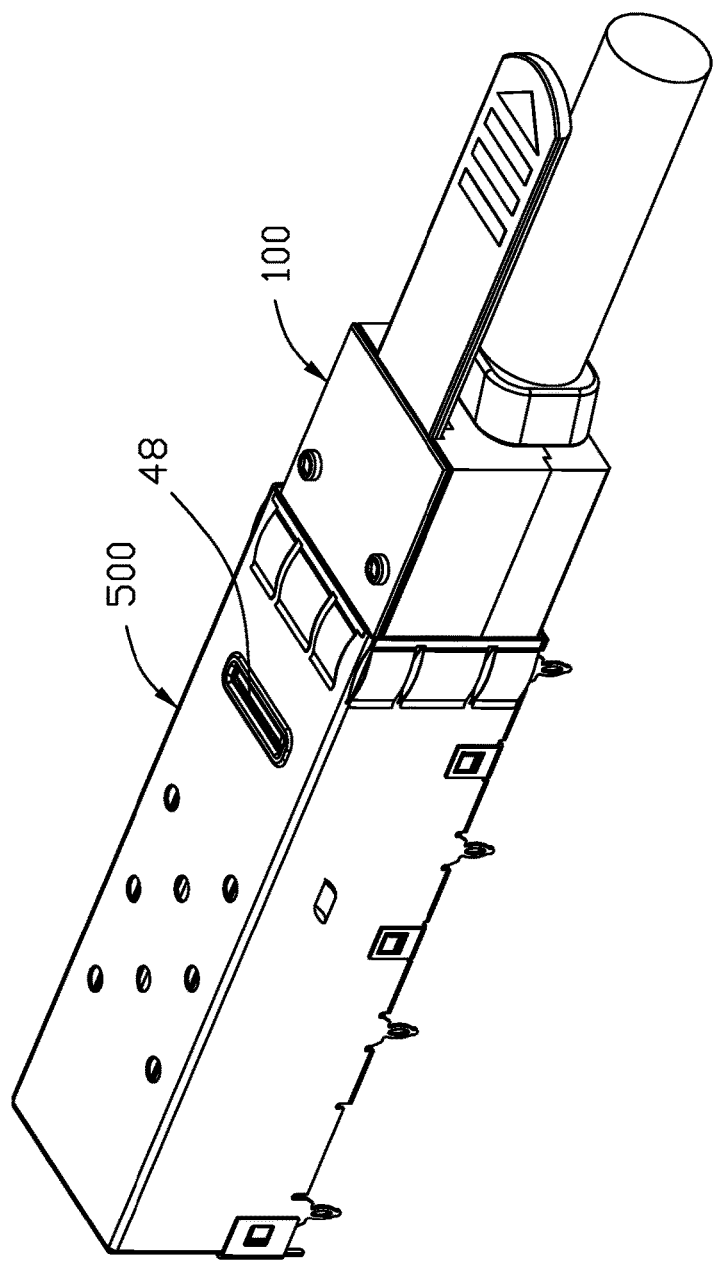
FIG. 1 is a perspective view of an electrical cable connector received within a metallic cage according to the present invention.
Figure 2:
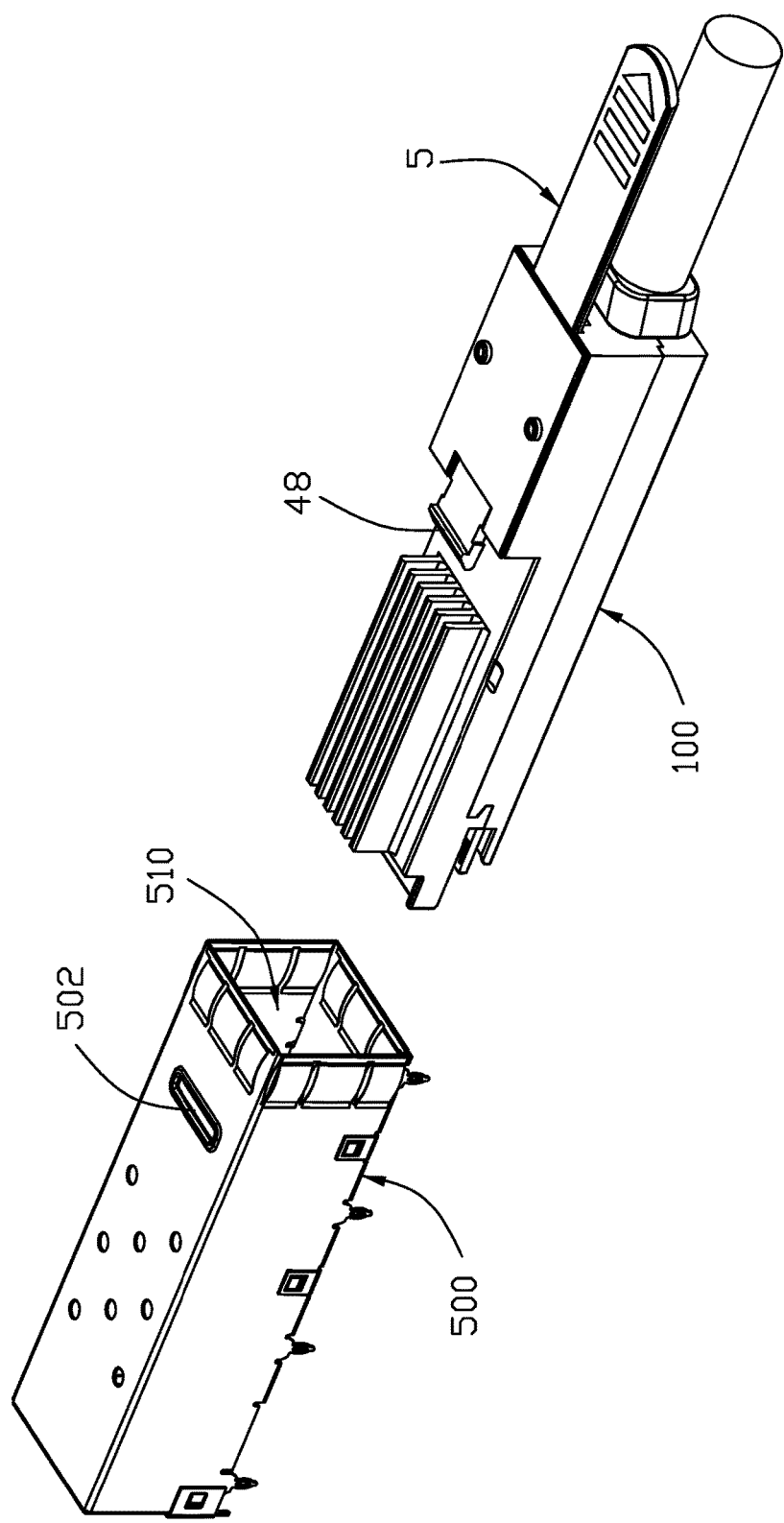
FIG. 2 is a perspective view of the electrical cable connector unlatched/detached from the cage of FIG. 1.
Figure 3:
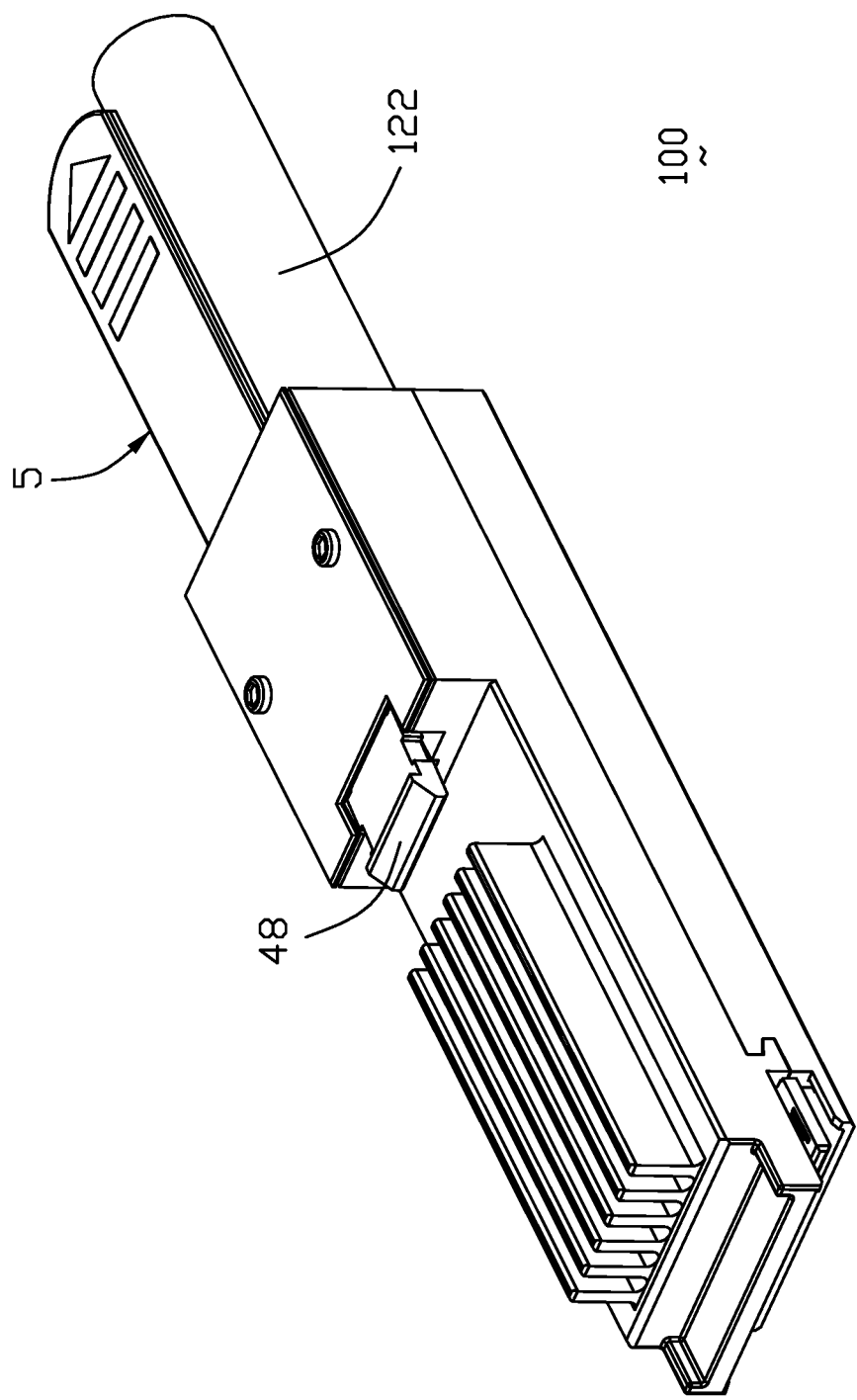
FIG. 3 is a perspective view of the electrical cable connector of FIG. 1.
Figure 4:
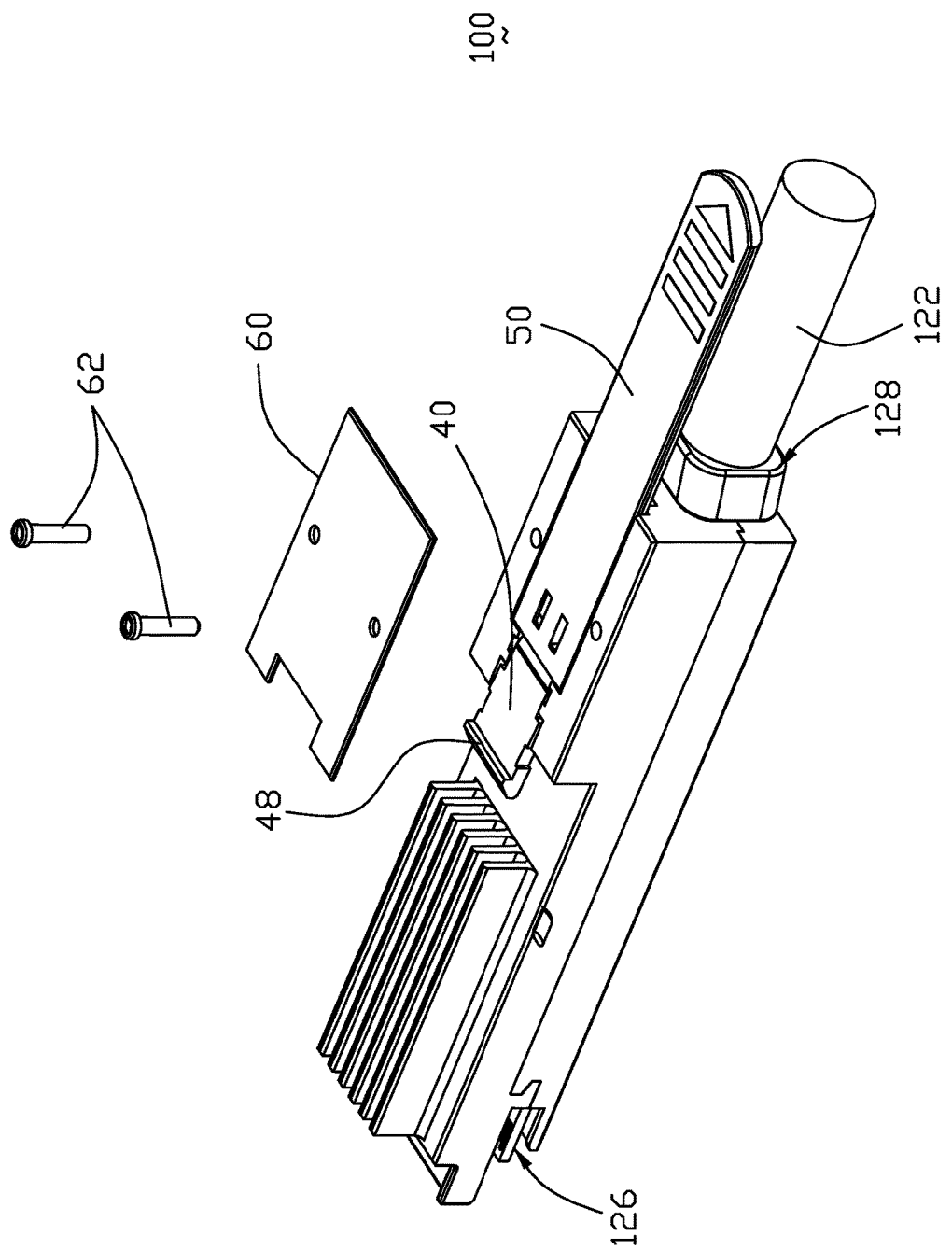
FIG. 4 is an exploded view of the electrical cable connector of FIG. 1 with a cover detached therefrom to expose the latch and the actuator under the cover.
Figure 5A:
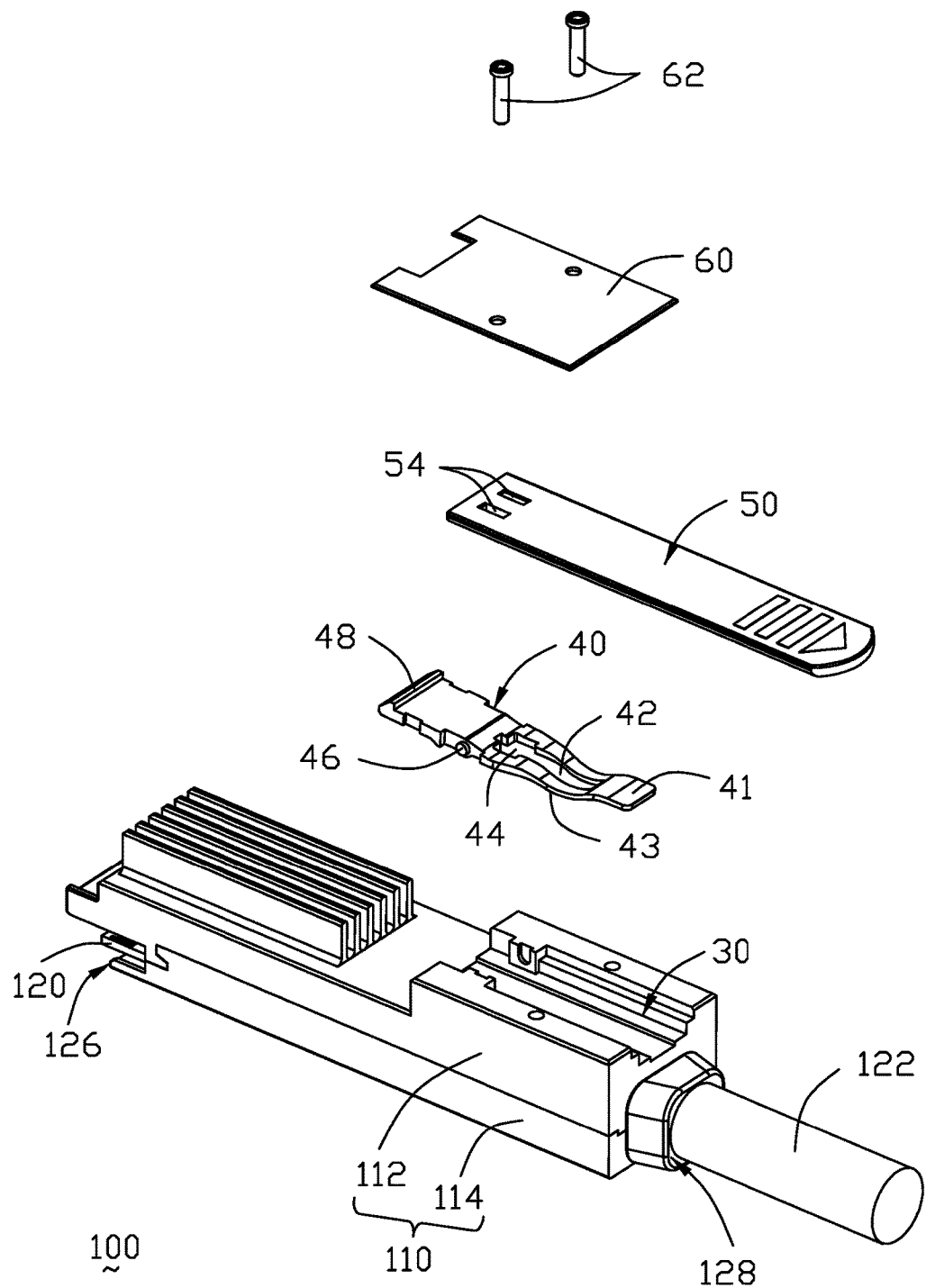
FIG. 5(A) is a downward further exploded perspective view of the electrical cable connector of FIG. 4.
Figure 5B:
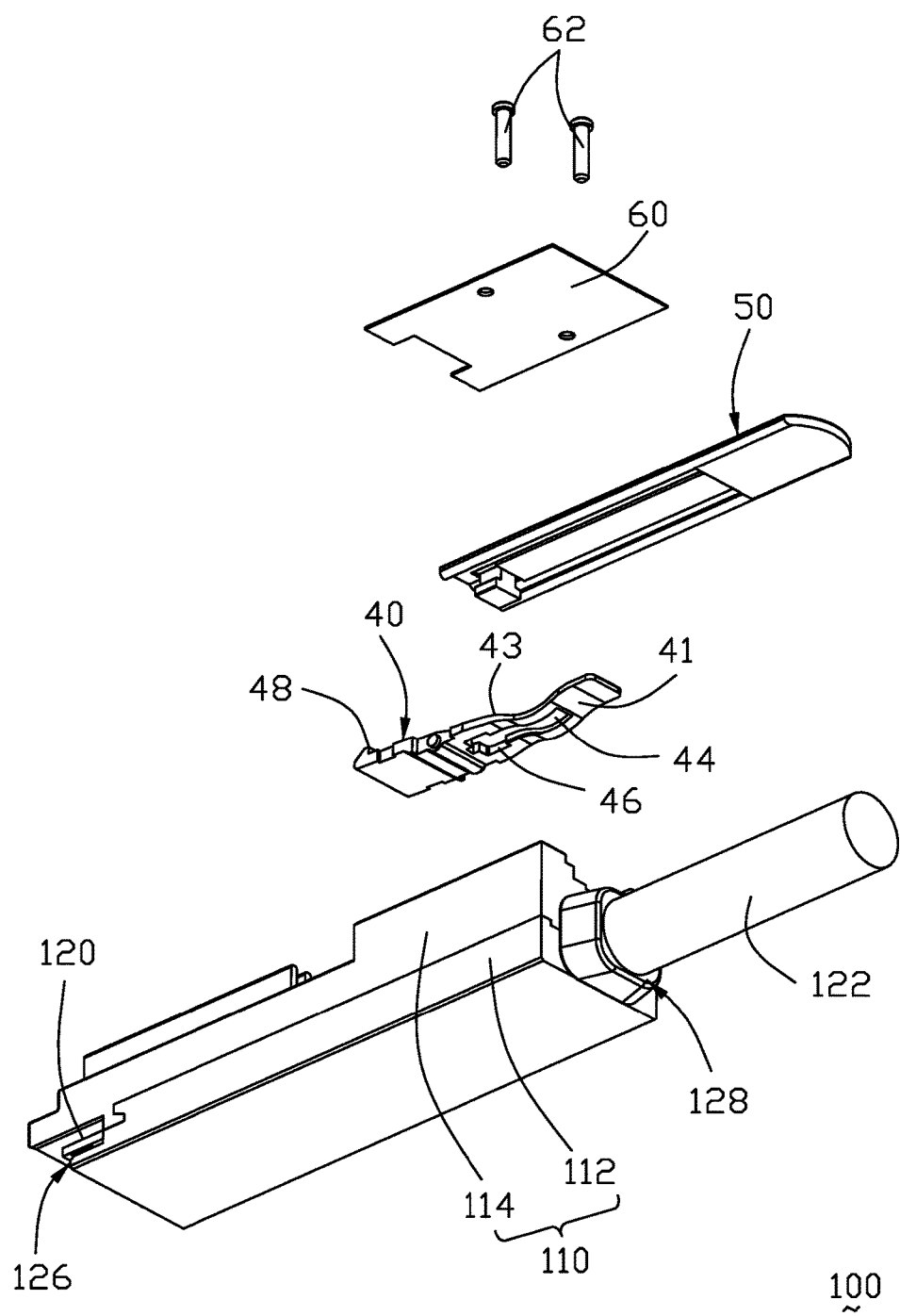
FIG. 5(B) is an upward further exploded perspective view of the electrical cable connector of FIG. 4.
Figure 6:
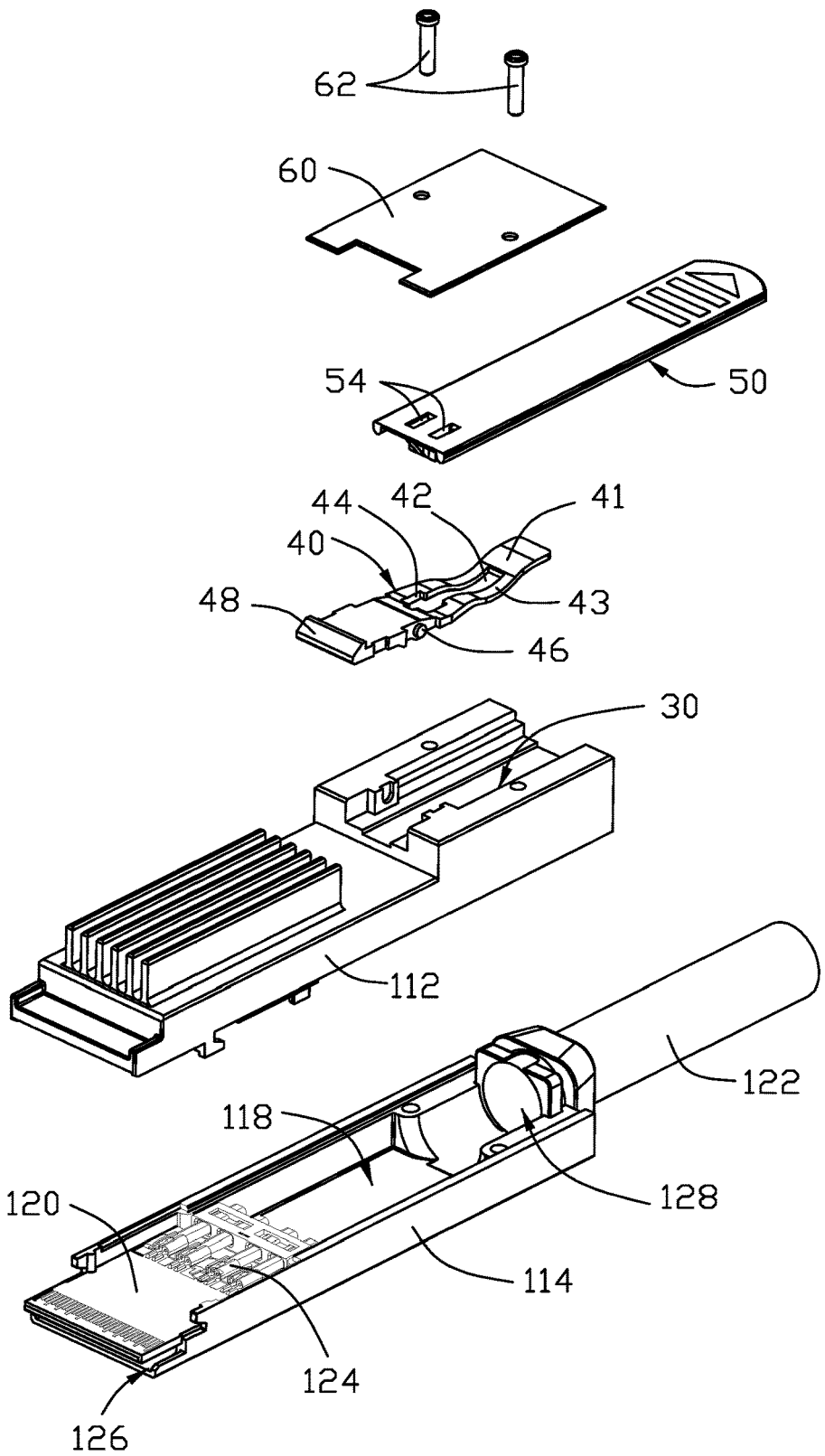
FIG. 6 is a downward further exploded perspective view of the electrical cable connector FIG. 5(A) wherein portions of the wires are removed to show the rear receiving cavity.
Figure 7:
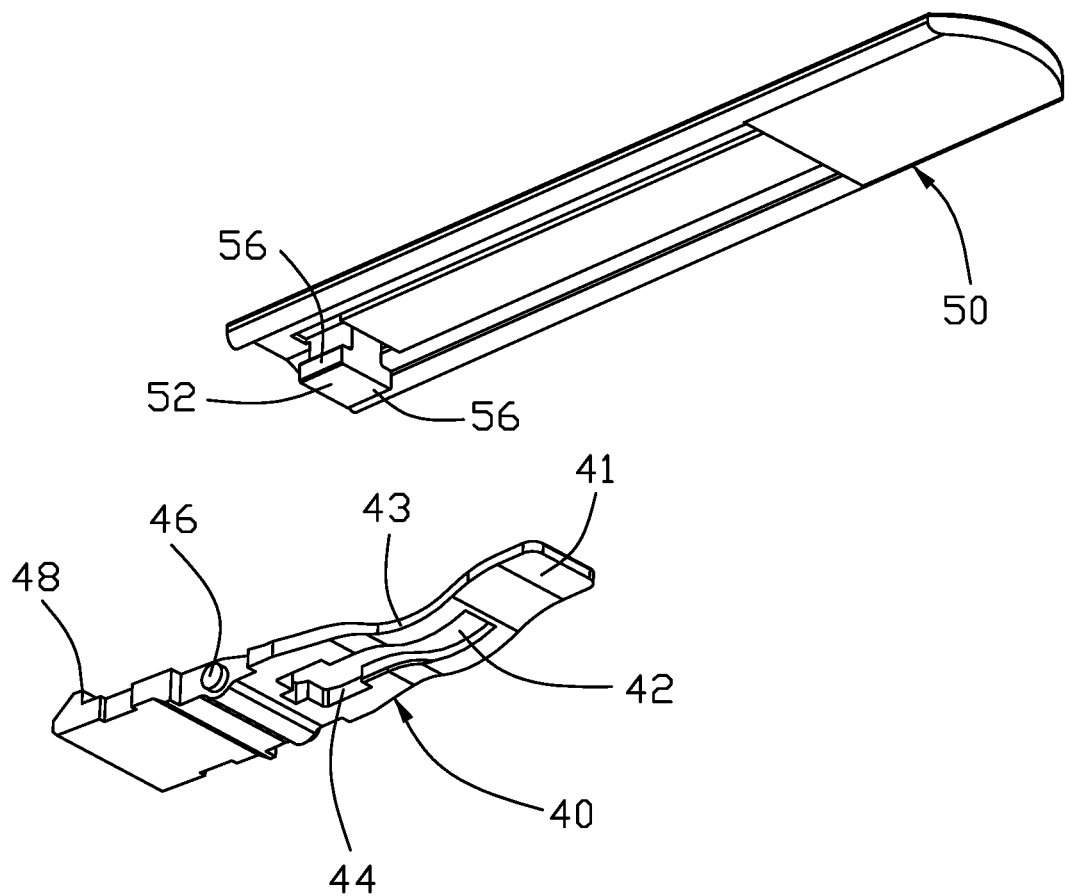
FIG. 7 is an upward exploded perspective view of the latch and the actuator of FIG. 6.
Figure 7A:
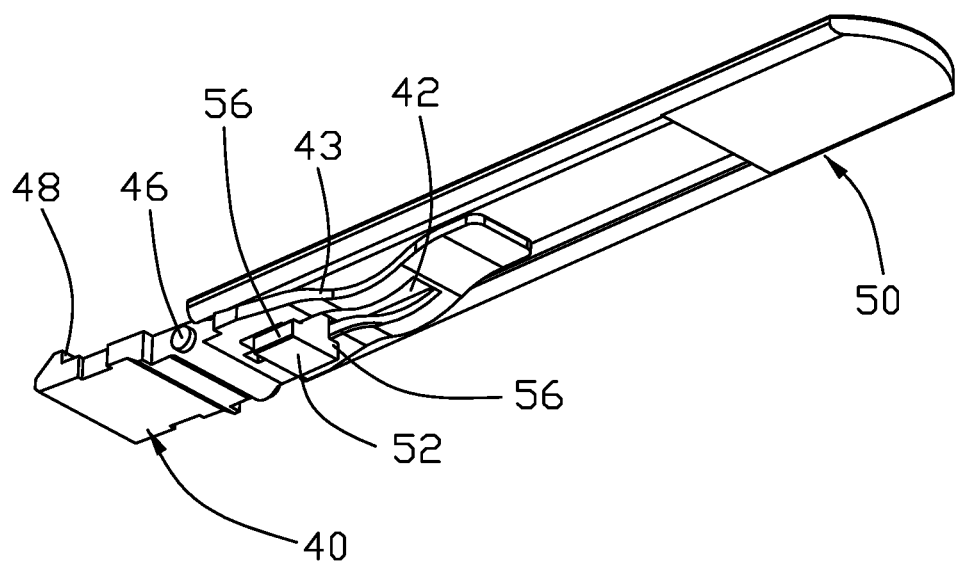
FIG. 7(A) is an upward assembled perspective view of the latch and the actuator of FIG. 7.
Figure 8:
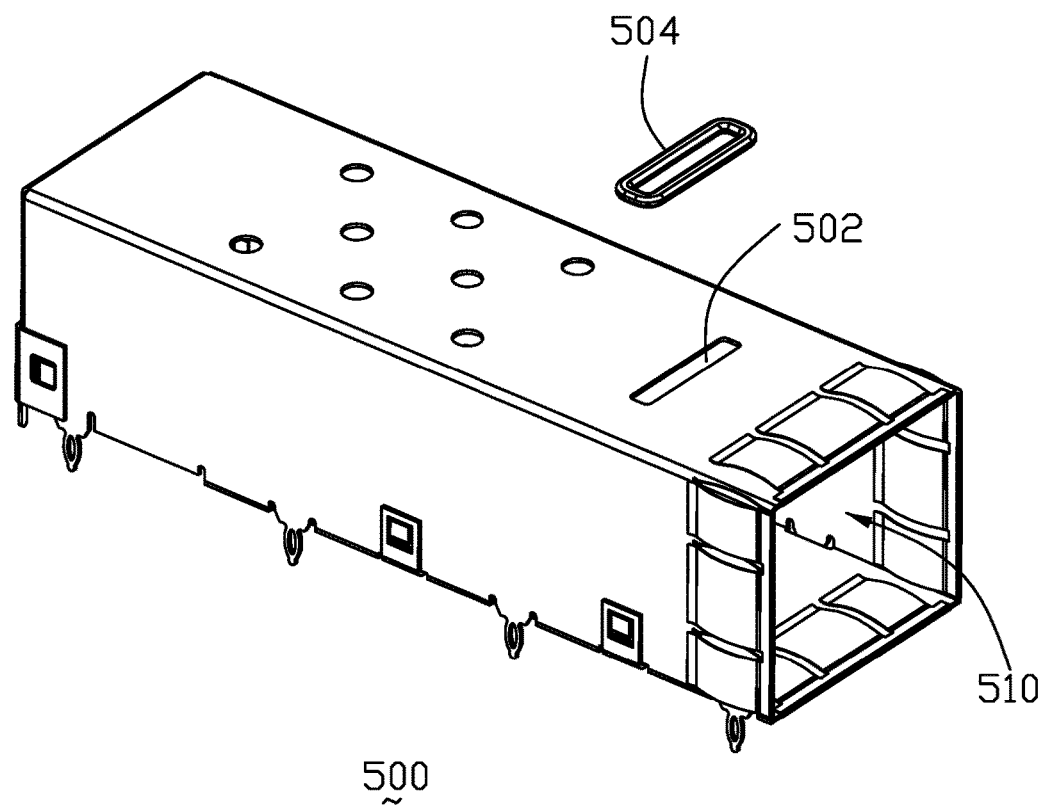
FIG. 8 is a perspective view of the metallic cage of FIG. 1.
Figure 9A:
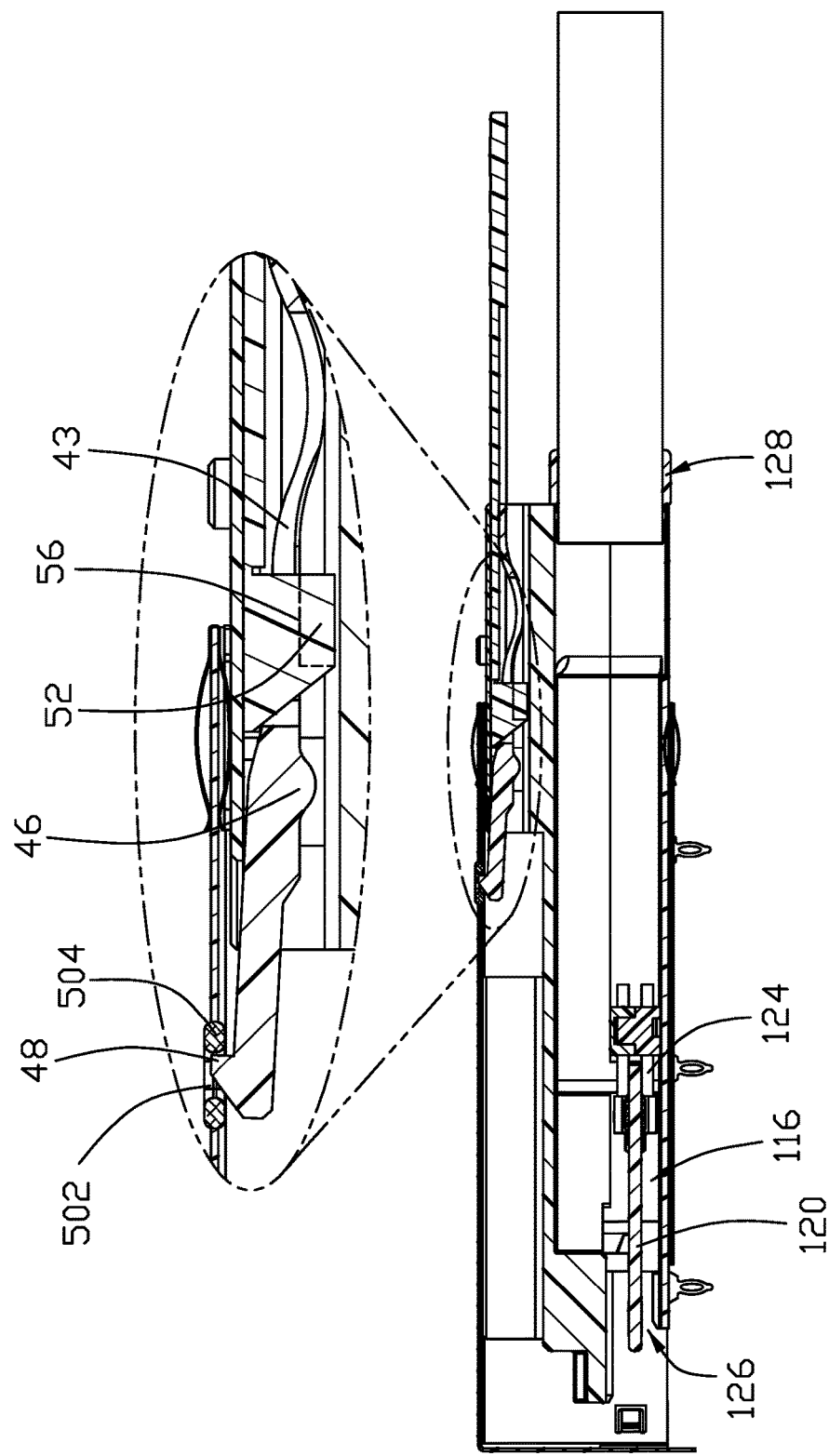
FIG. 9(A) is a cross-sectional view of the electrical cable connector of FIG. 1 to show the latch is engaged within the metallic cage.
Figure 9B:
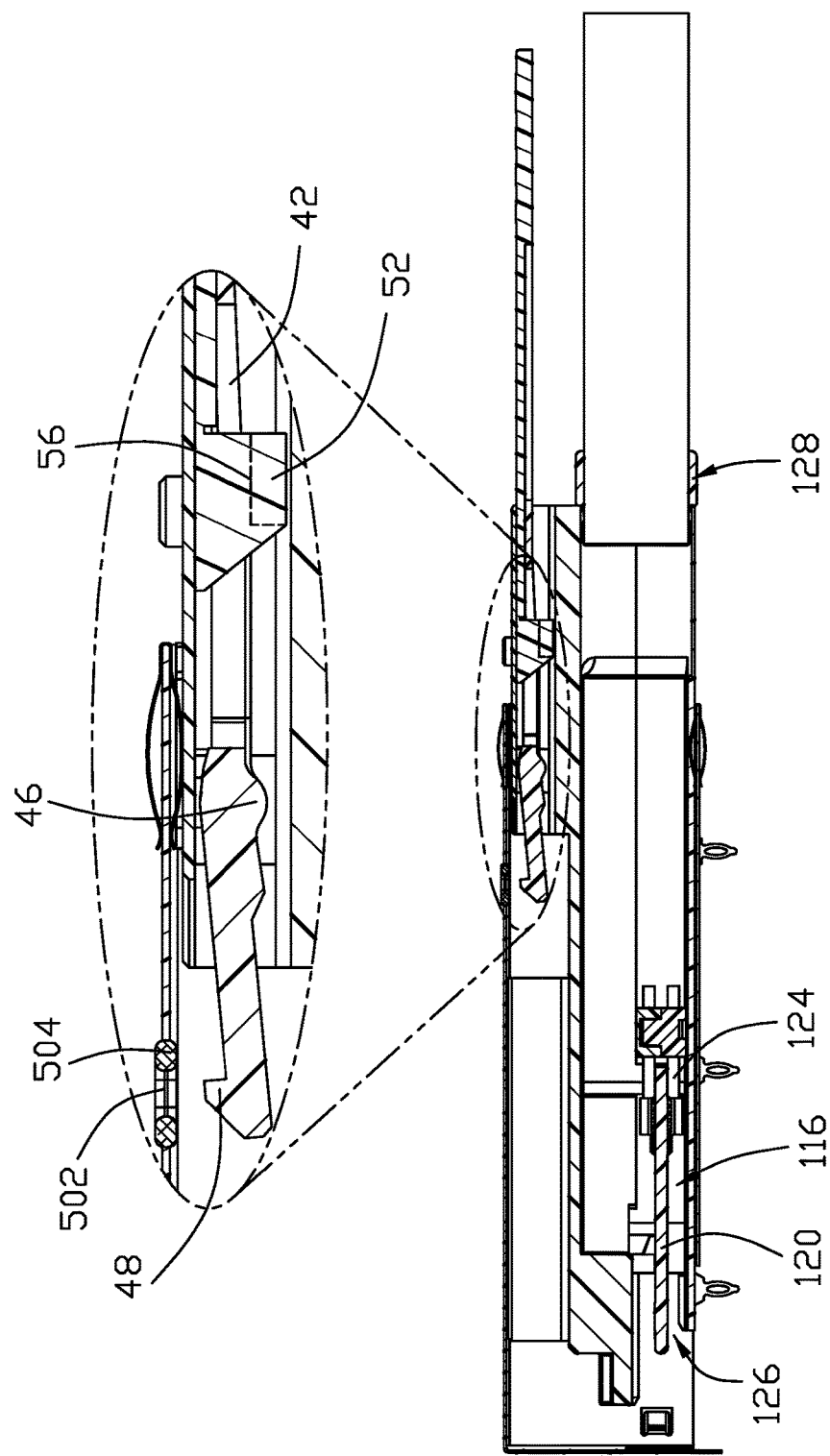
FIG. 9(B) is a cross-sectional view of the electrical cable connector of FIG. 1 to show the latch is disengaged from the metallic cage.
Figure 10:
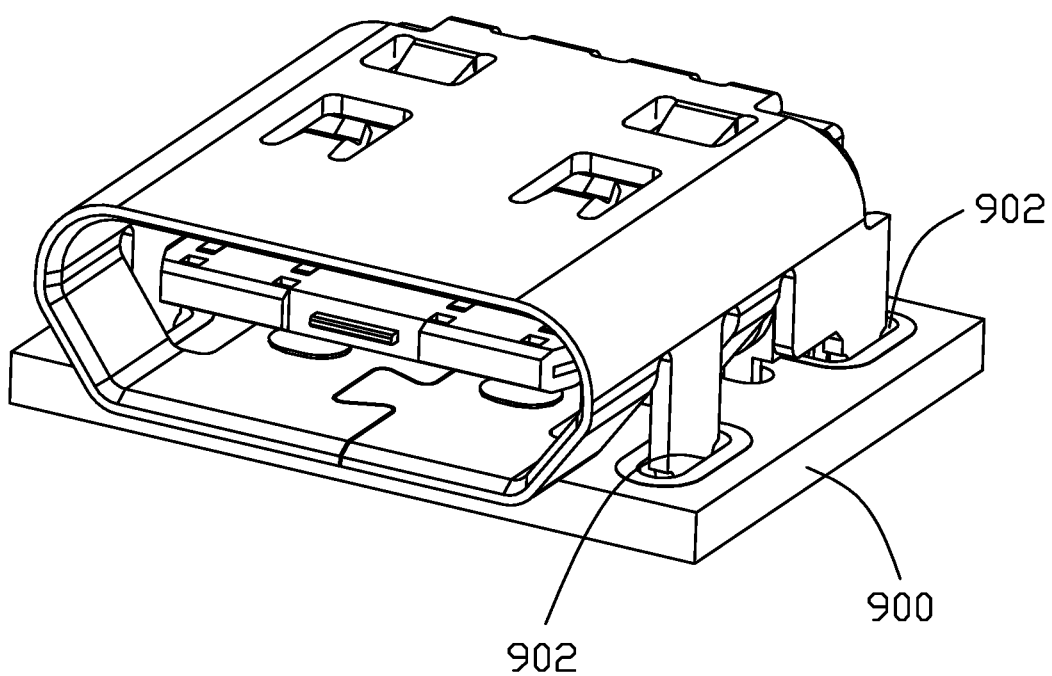
FIG. 10 is a perspective view of a receptacle connector derived/modified from the Type C connector and mounted upon a printed circuit board to form an electrical connector assembly.
Figure 11:
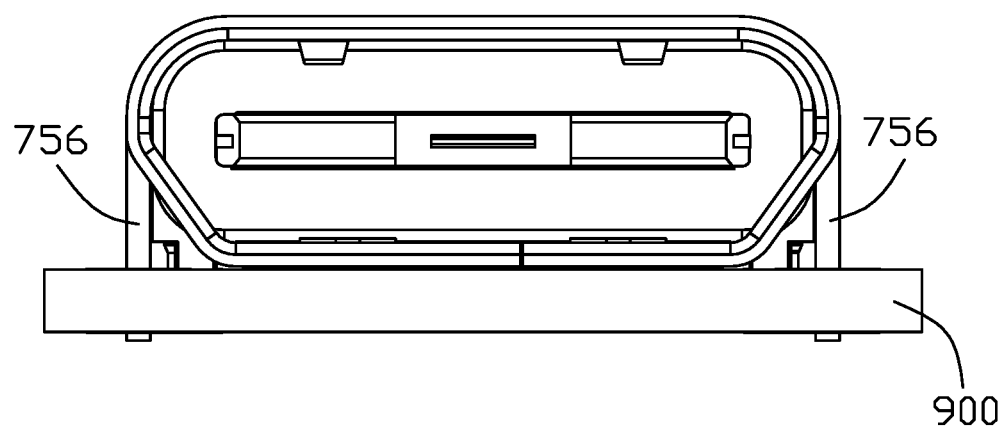
FIG. 11 is a front view of the electrical receptacle connector assembly of FIG. 10.
Figure 12A:
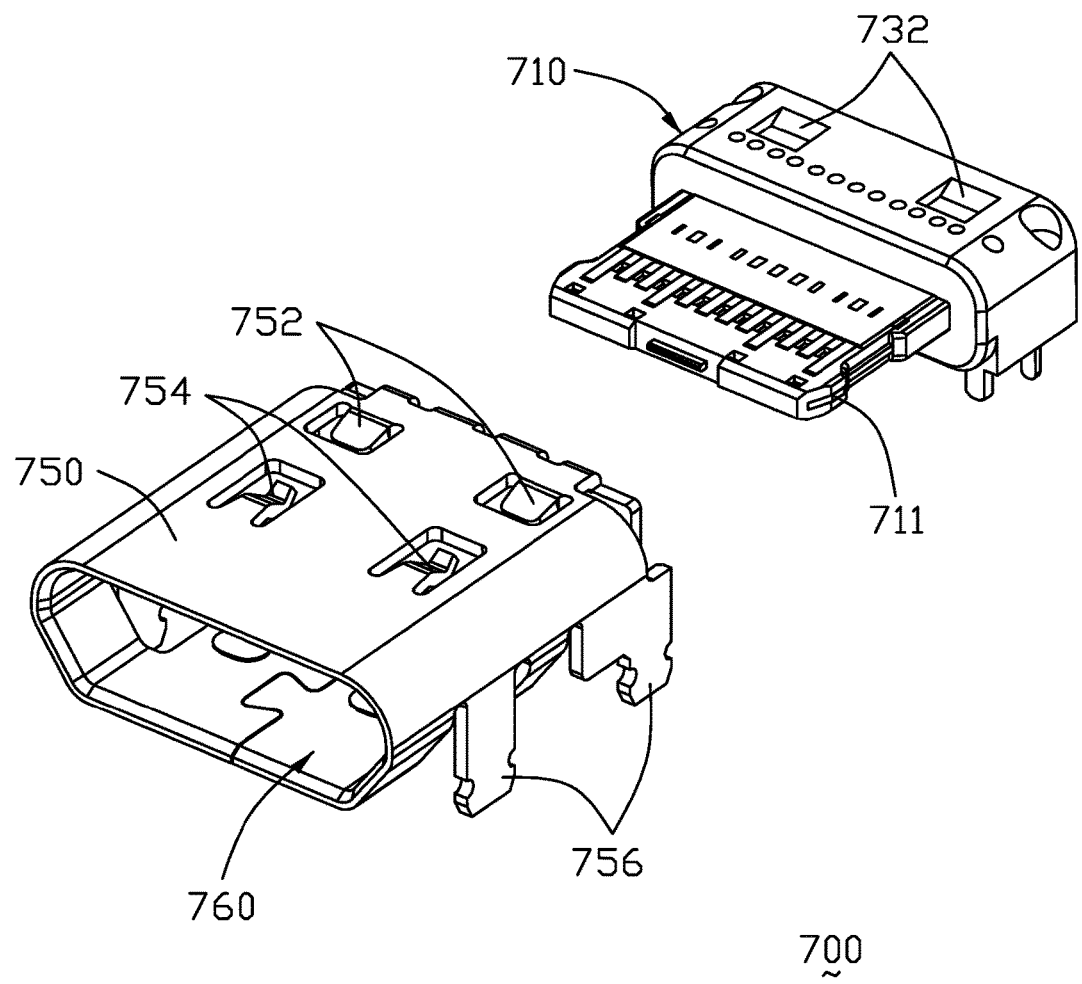
FIG. 12(A) is a downward exploded perspective view of the receptacle connector of FIG. 10.
Figure 12B:
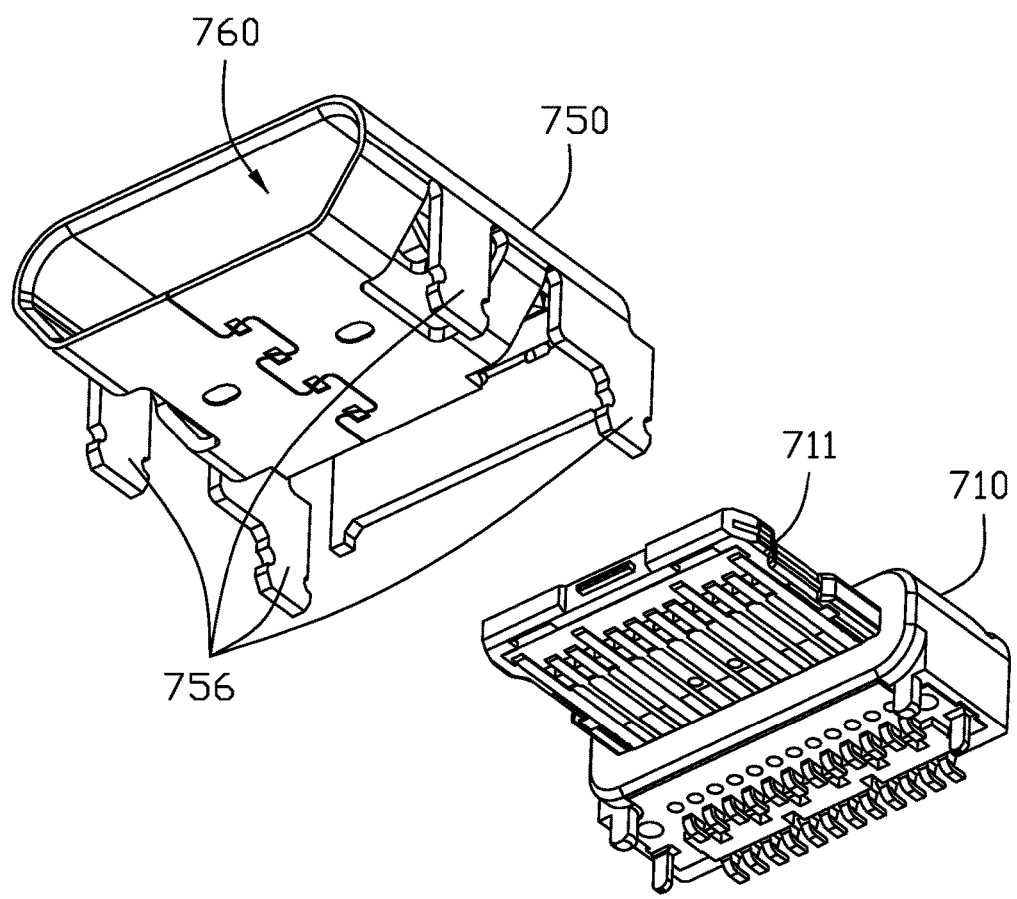
FIG. 12(B) is an upward exploded perspective view of the receptacle connector of FIG. 10.
Figure 13A:
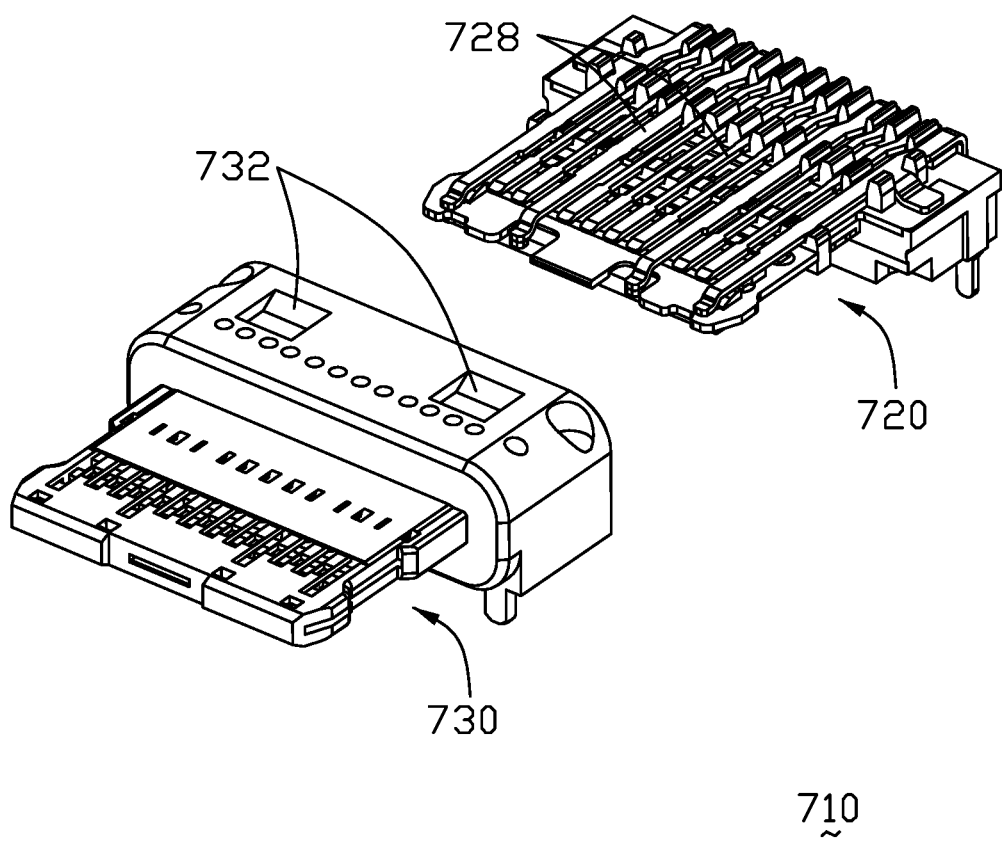
FIG. 13(A) is a downward exploded perspective view of the terminal module of the receptacle connector of FIG. 10.
Figure 13B:
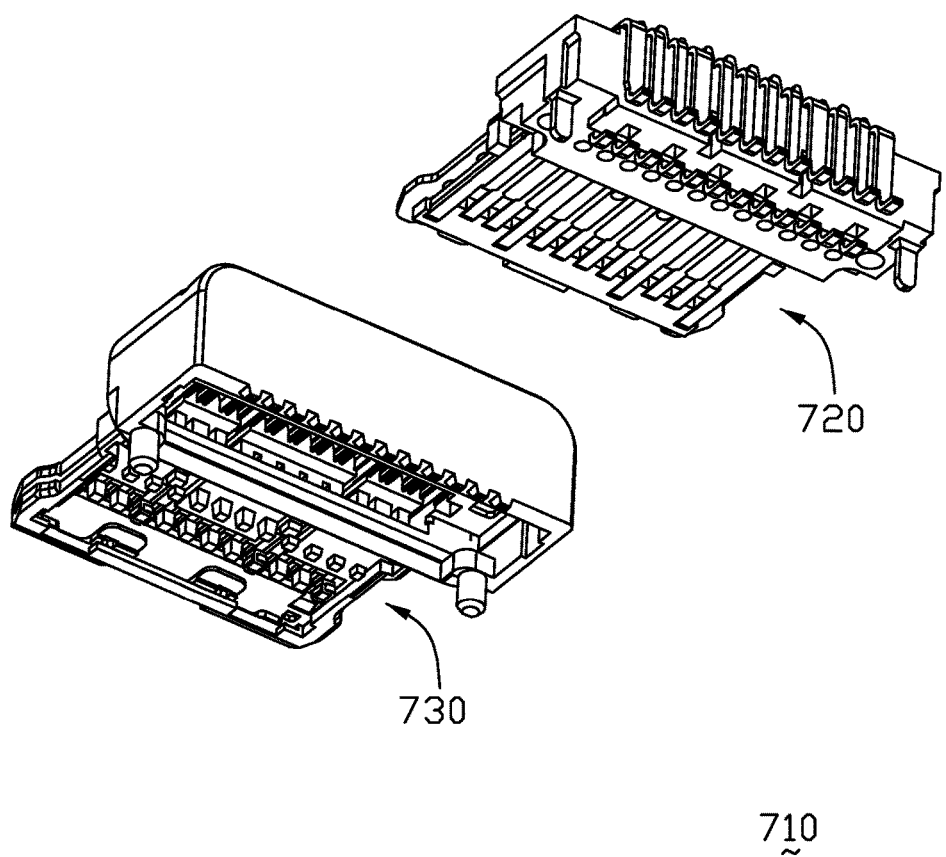
FIG. 13(B) is an upward exploded perspective view of the terminal module of the receptacle connector of FIG. 10.
Figure 14A:
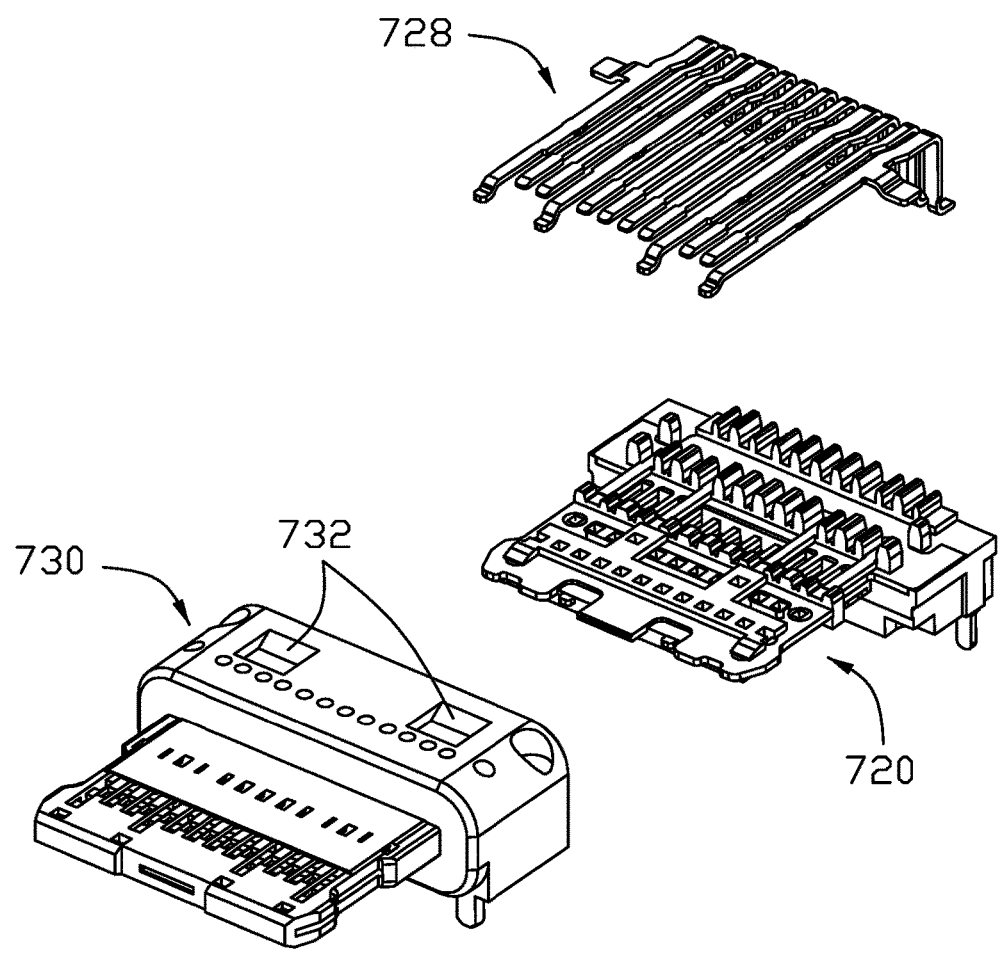
FIG. 14(A) is a downward further exploded perspective view of the terminal module of the receptacle connector of FIG. 13(A)
Figure 14B:
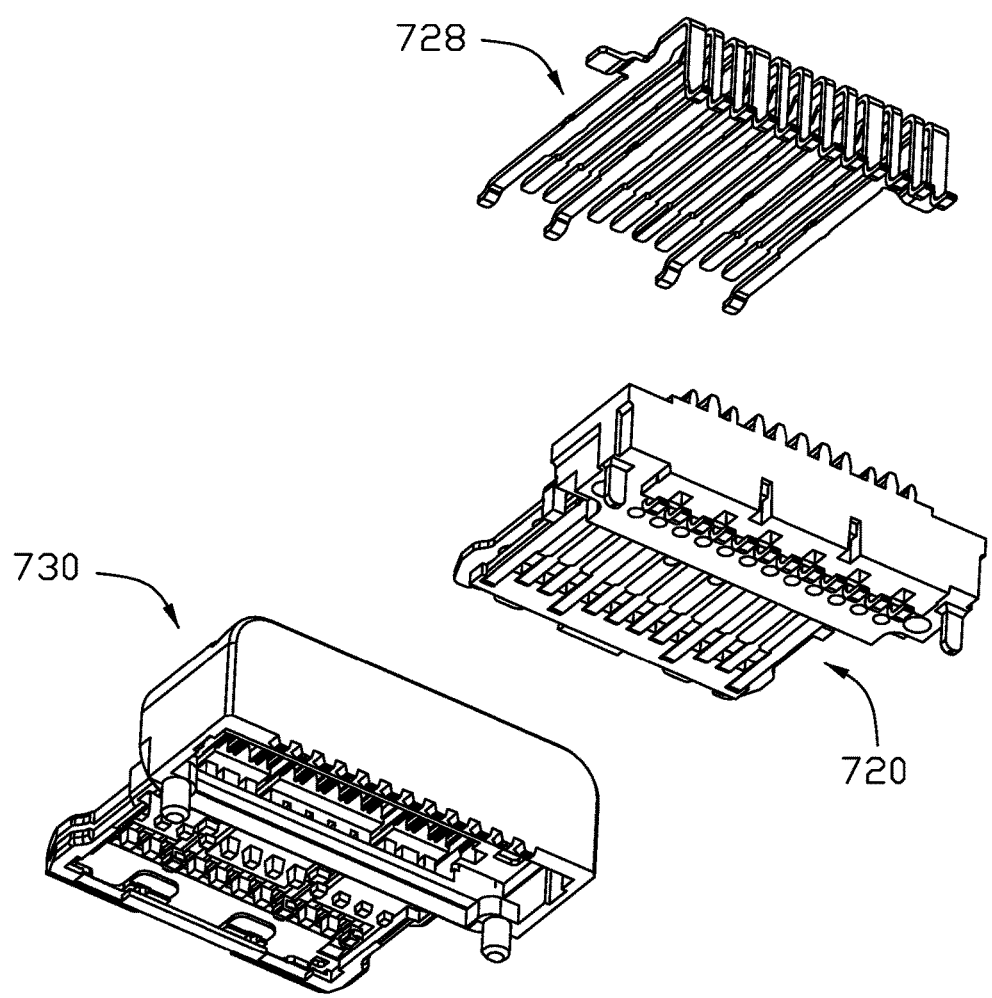
FIG. 14(B) is an upward further exploded perspective view of the terminal module of the receptacle connector of FIG. 13(B)
Figure 15A:
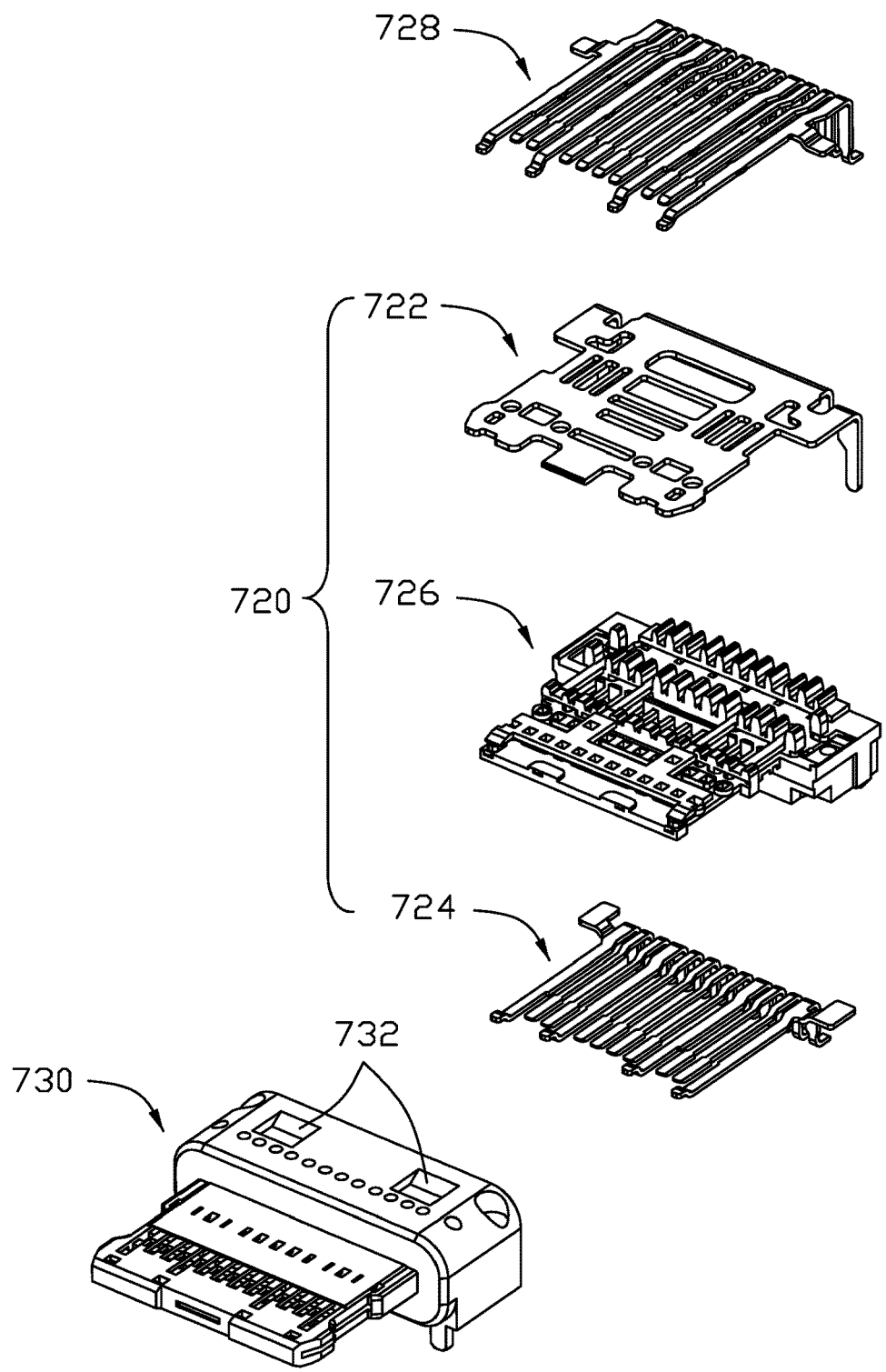
FIG. 15(A) is a downward further exploded perspective view of the terminal module of the receptacle connector of FIG. 14(A)
Figure 15B:
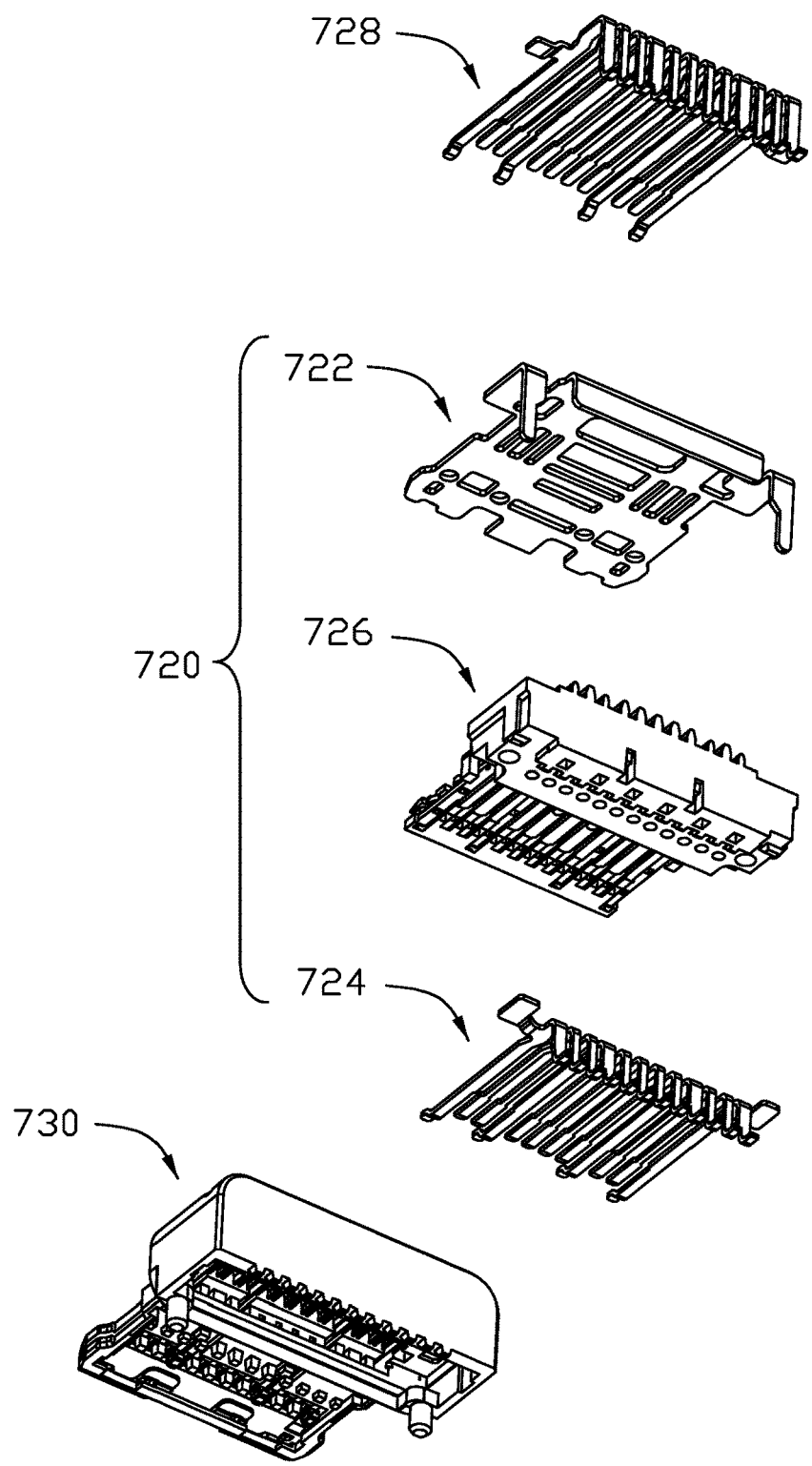
Figure 16:
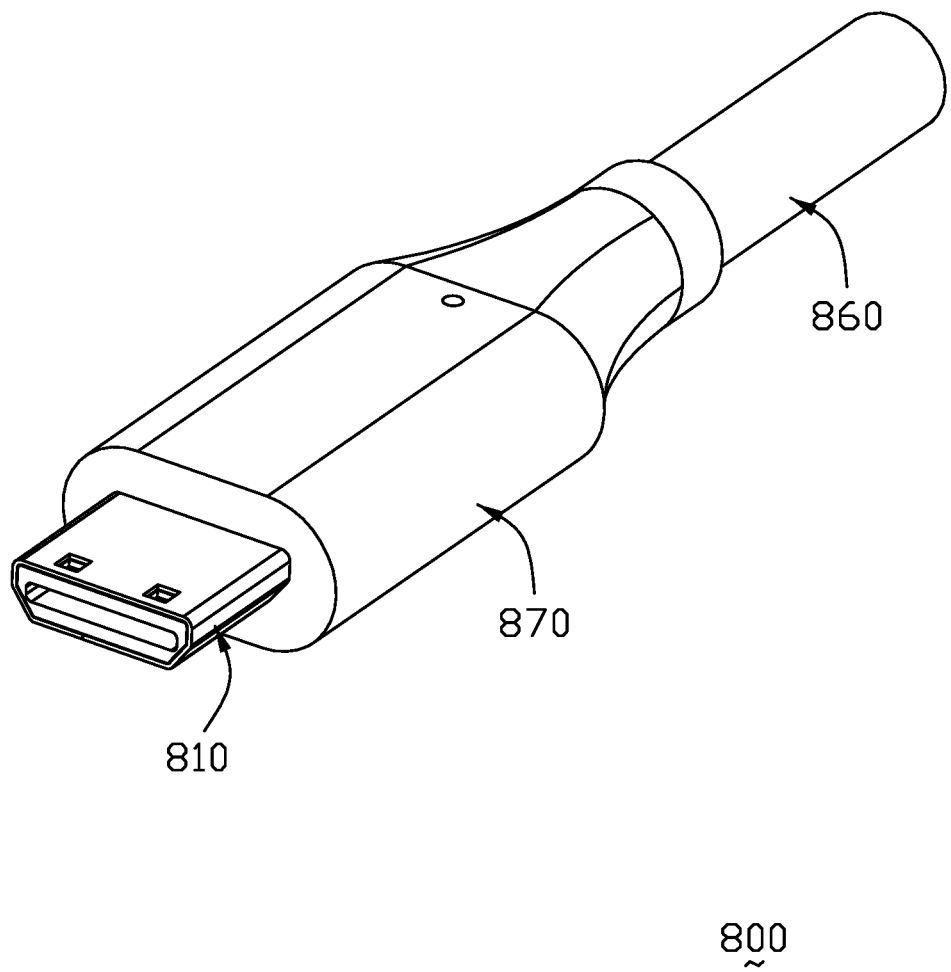
FIG. 16 is a perspective view of a cable connector which is adapted to mate with a receptacle connector which is very similar to the receptacle connector of FIG. 10.
Figure 17:
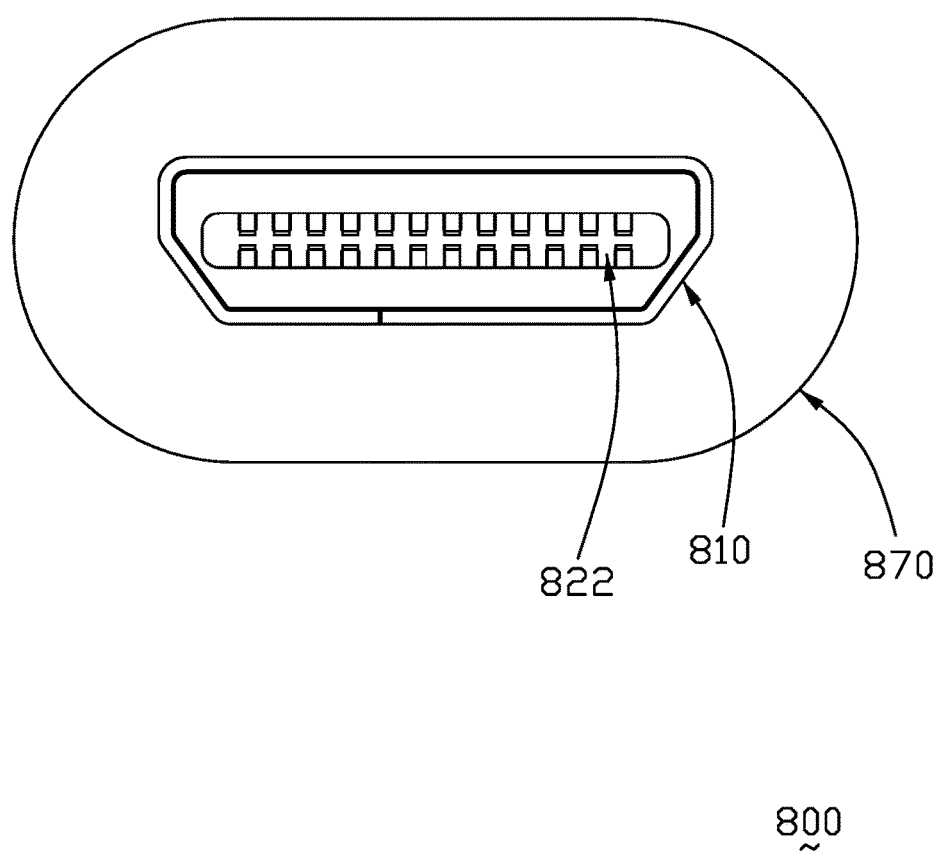
FIG. 17 is a front view of a cable connector of FIG. 16.
Figure 18A:
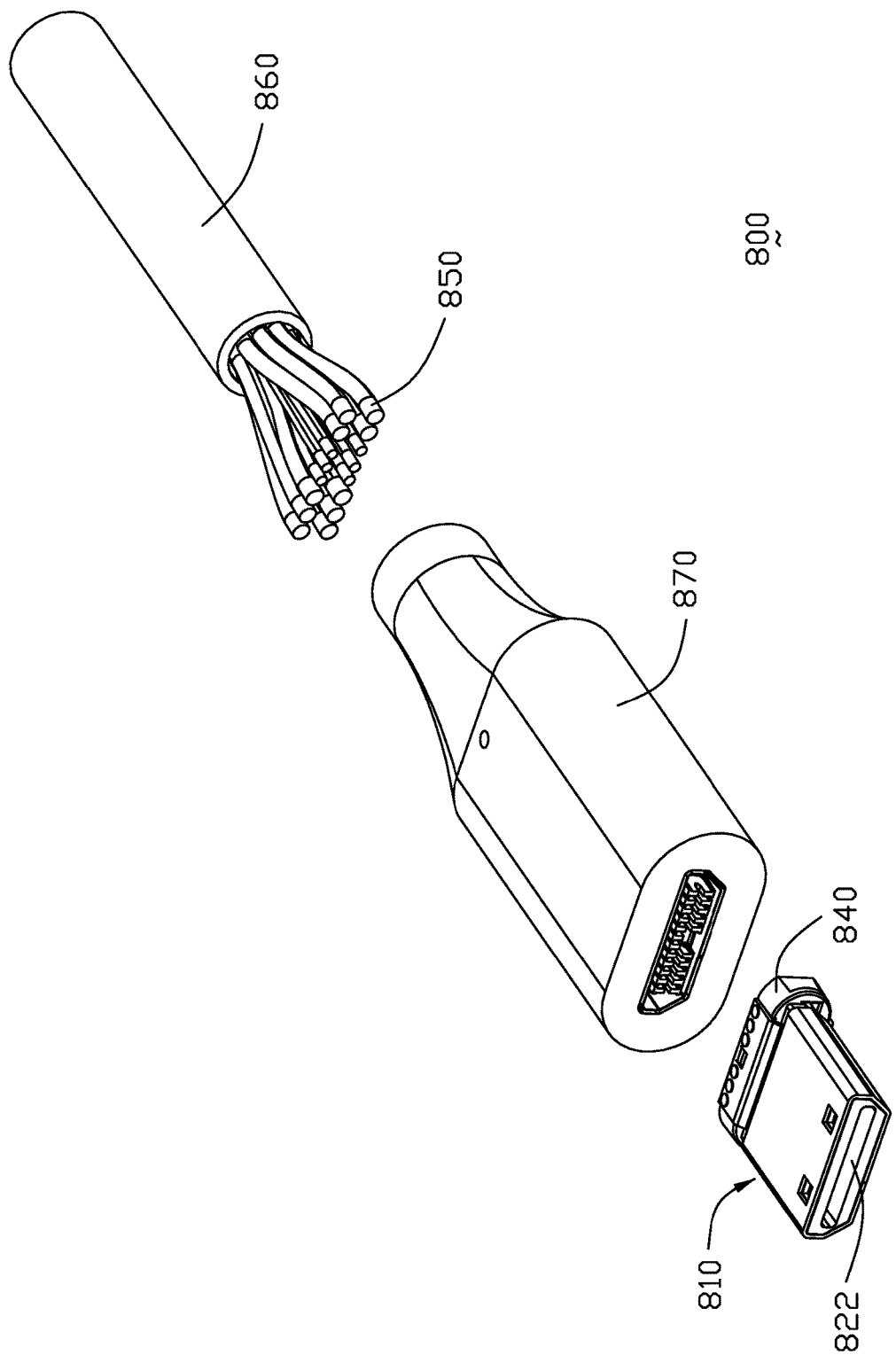
FIG. 18(A) is a downward exploded perspective view of the cable connector of FIG. 16.
Figure 18B:
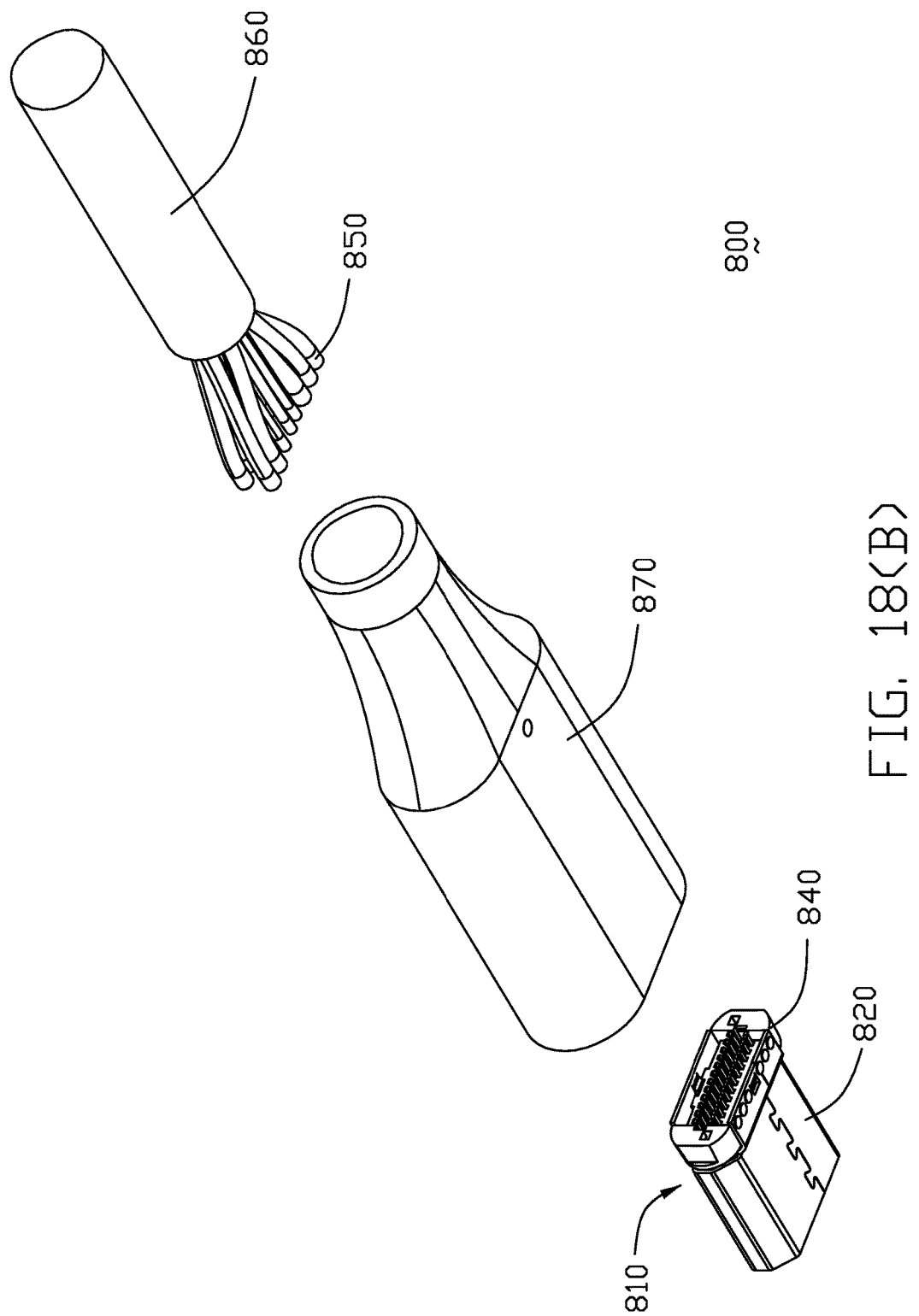
FIG. 18(B) is an upward exploded perspective view of the cable connector of FIG. 16.
Figure 19A:
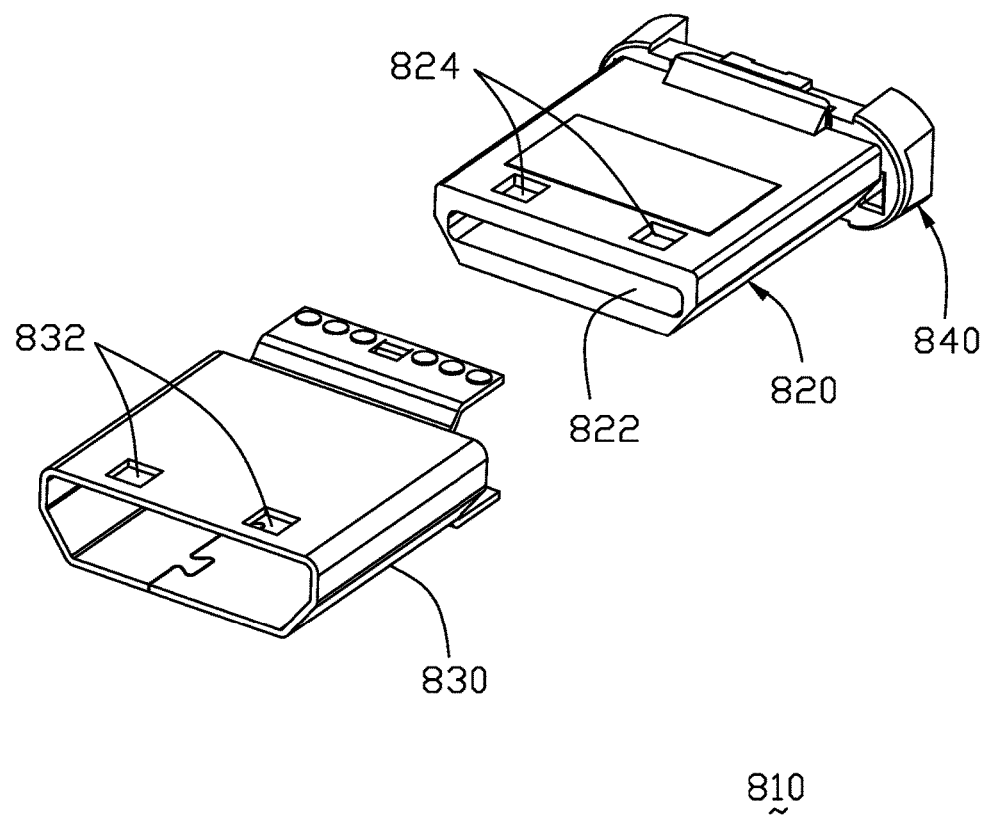
FIG. 19(A) is a downward further exploded perspective view of the mating unit of the cable connector of FIG. 18(A)
Figure 19B:
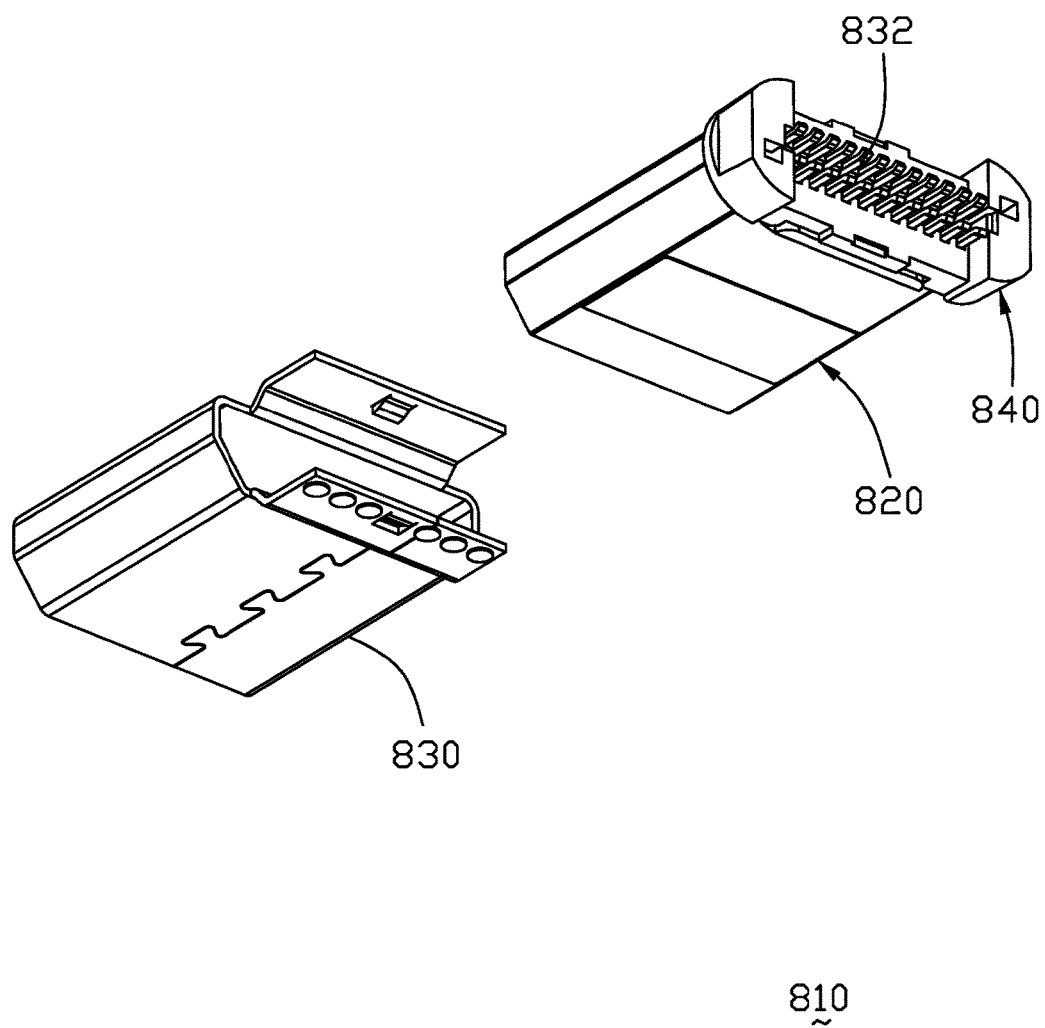
FIG. 19(B) is an upward further exploded perspective view of the mating unit of the cable connector of FIG. 18(B)
Figure 20A:
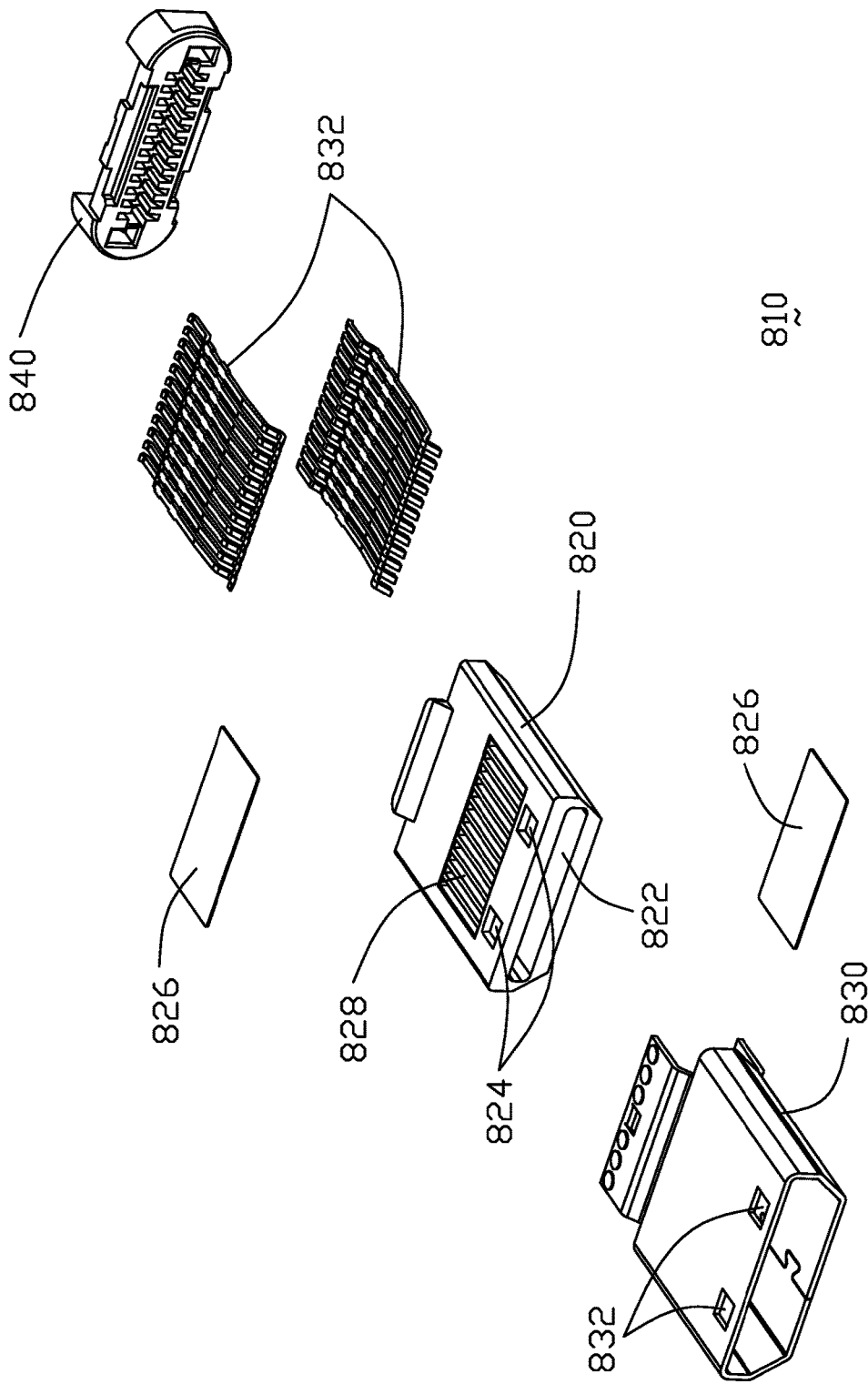
FIG. 20(A) is a downward further exploded perspective view of the mating unit of the cable connector of FIG. 19(A)
Figure 20B:
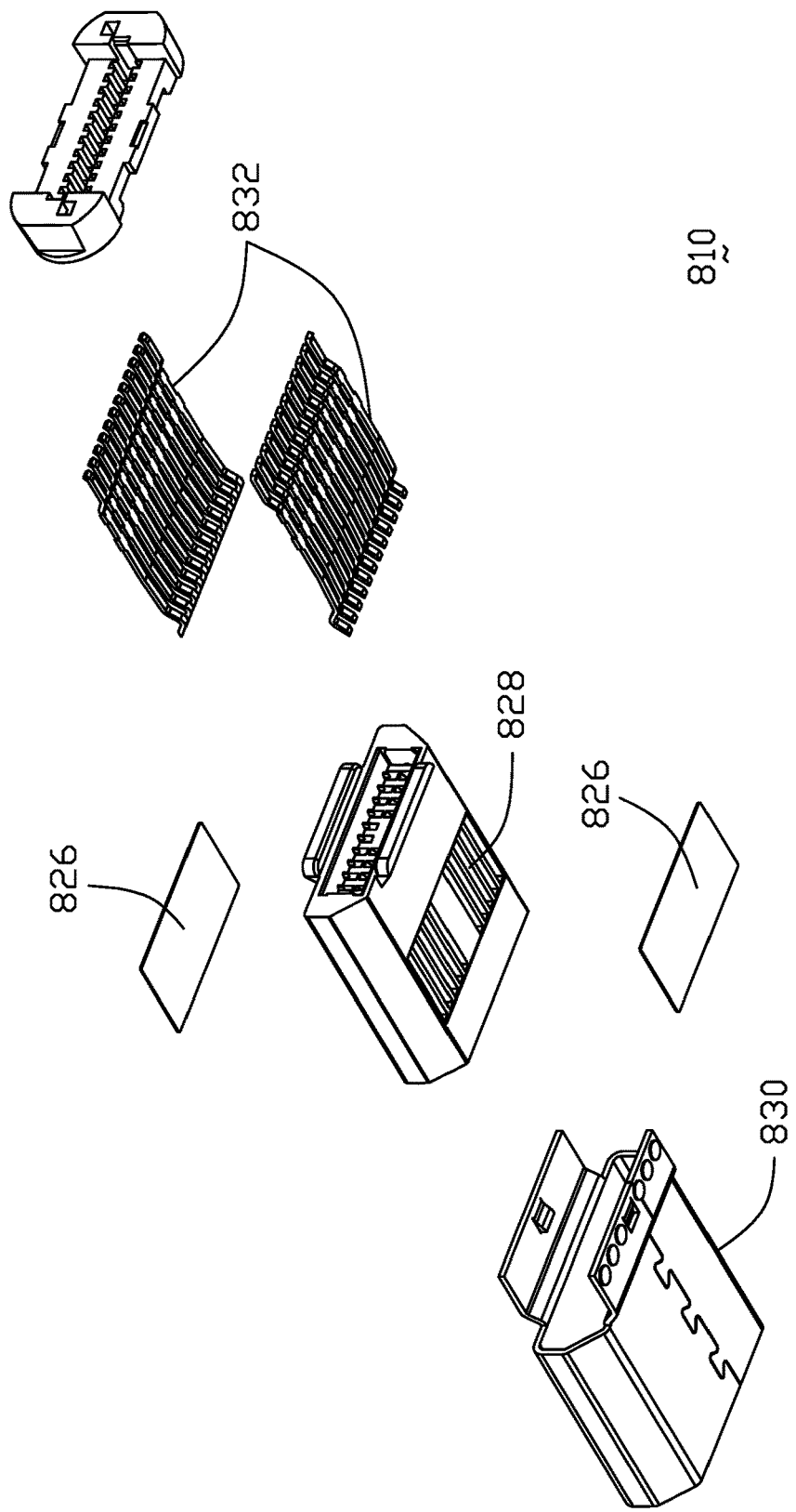
FIG. 20(B) is an upward further exploded perspective view of the mating unit of the cable connector of FIG. 19(B)
Figure 21:
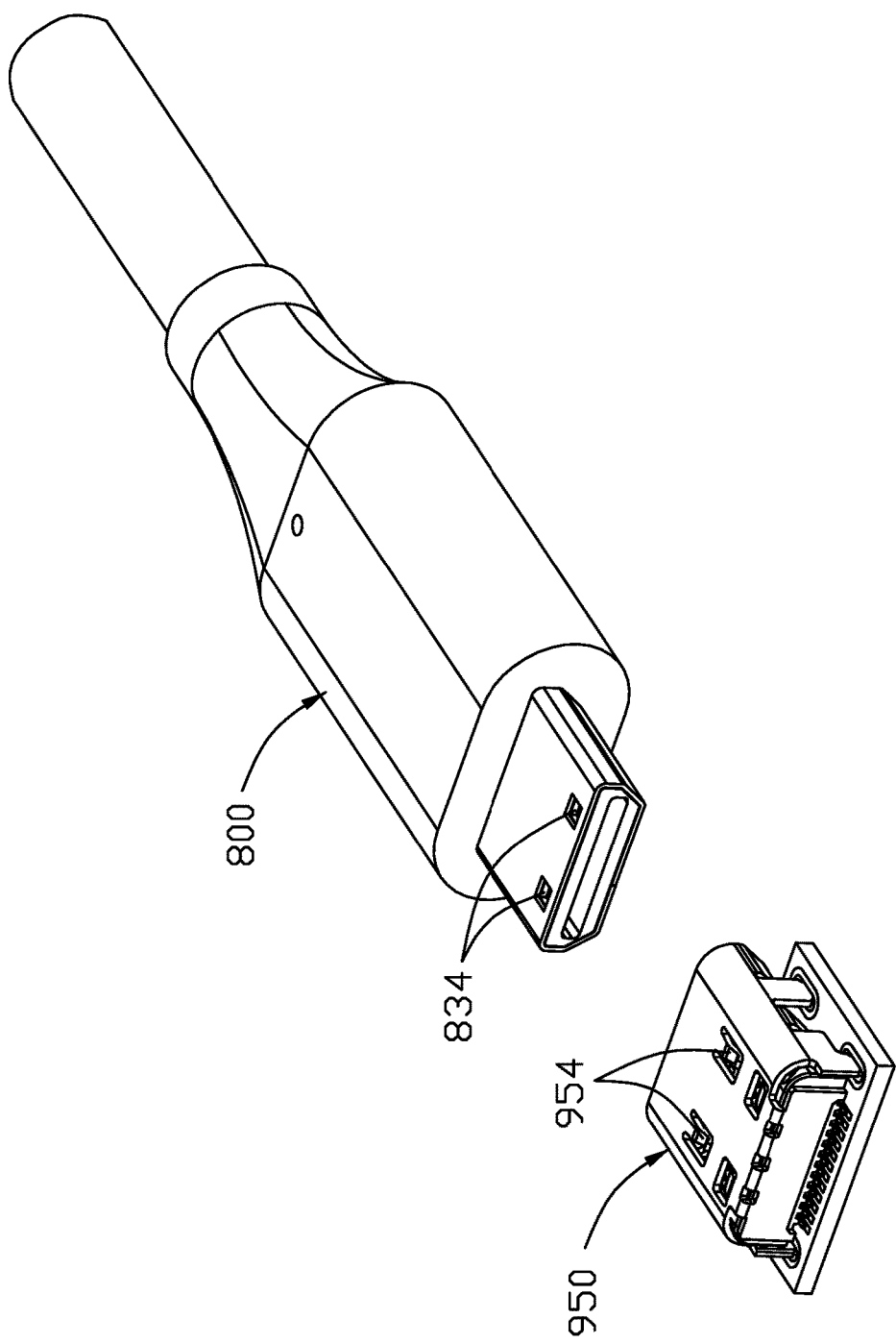
FIG. 21 is a downward perspective view of the cable connector of FIG. 16 and a corresponding receptacle connector adapted to be mated with each other.
Figure 22:
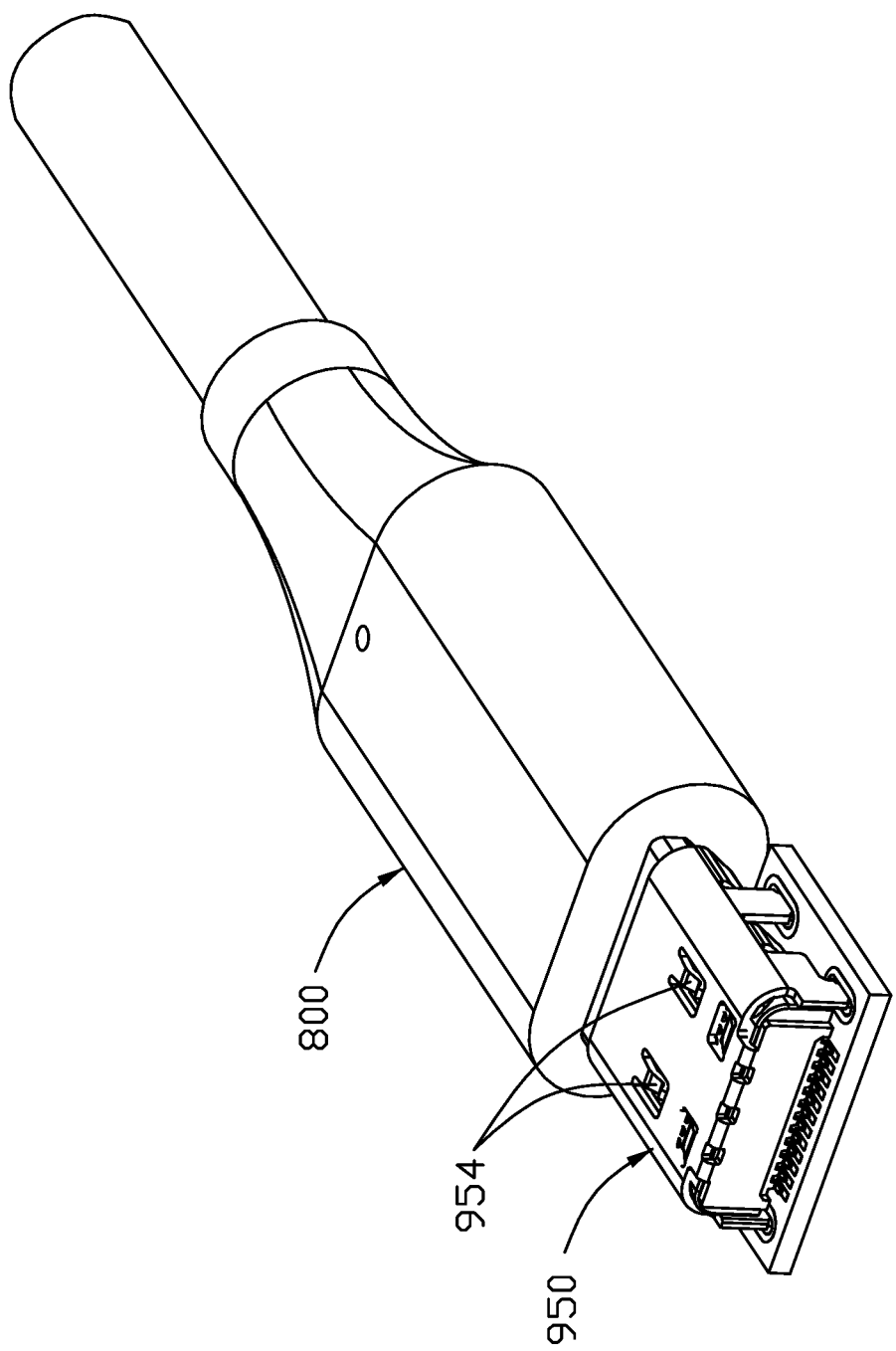
FIG. 22 is a downward perspective view of the cable connector and the corresponding receptacle connector of FIG. 21 in a mated manner.
Figure 24:
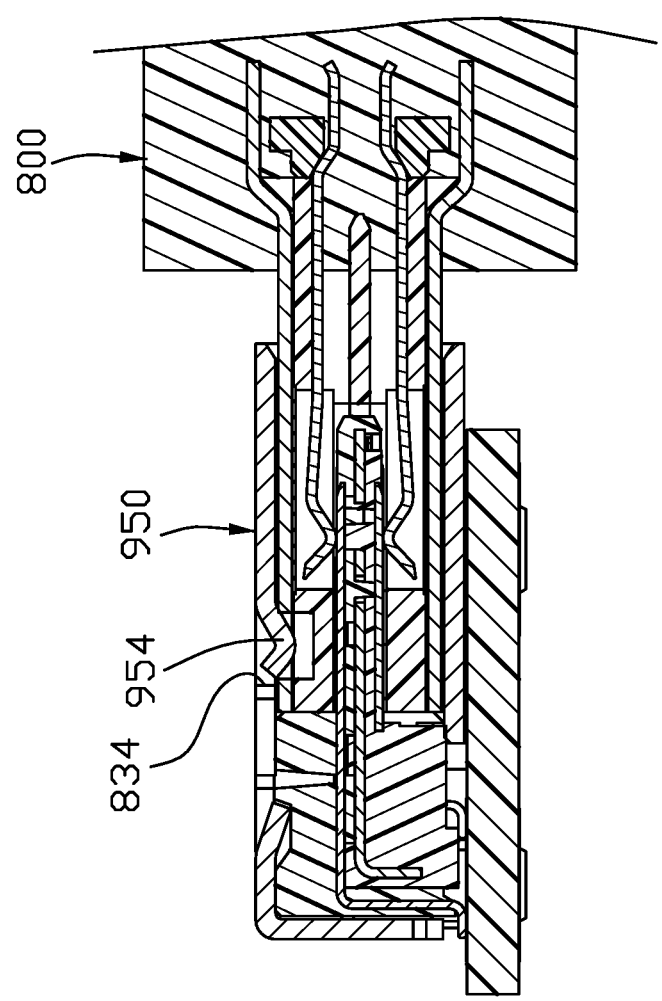
FIG. 24 is a cross-sectional view of the cable connector and the receptacle connector of FIG. 22.
Figure 25:
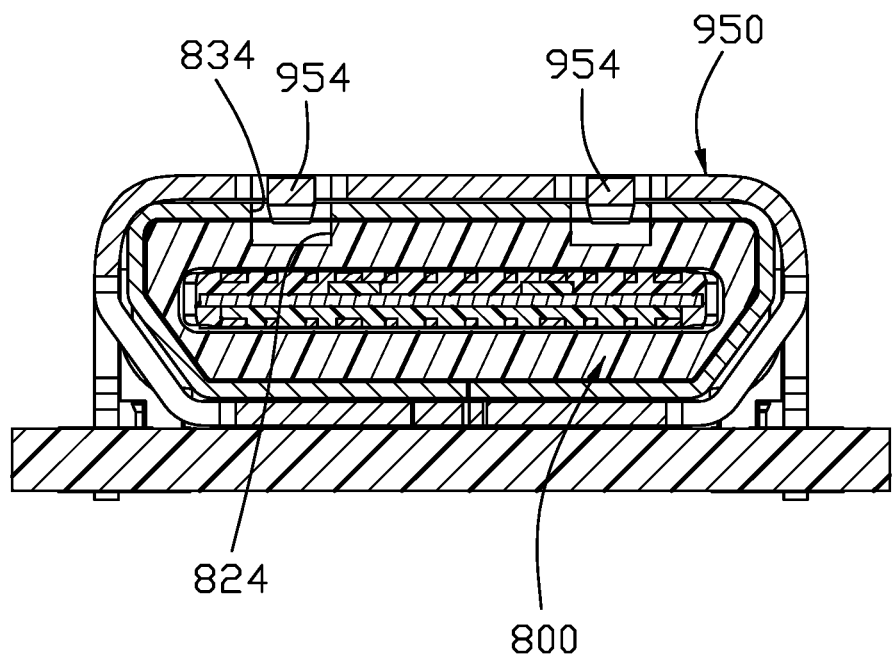
FIG. 25 is another cross-sectional view of the cable connector and the receptacle connector of FIG. 22.

Reference will now be made in detail to the preferred embodiment of the present invention. Referring to FIGS. 1-9(B), an electrical cable connector 100 is adapted to be received and latched within a receiving space 510 of a metallic cage 500. The electrical cable connector includes a metallic case 110 essentially composed of an upper case 112 and a lower case 114 to commonly form a front receiving cavity 116 and a rear receiving cavity 118. A printed circuit board 120 is received within the front receiving cavity 116, and a cable 122 includes a plurality of wires 124 which are received within the rear receiving cavity 118. The wires 124 are soldered upon a rear region of the printed circuit board 120. The case 110 forms a front mating port 126 in which the printed circuit board 120 is located, and a rear connecting port 128 through which the cable 122 rearwardly extends.

A receiving room 30 is formed in the upper case 112. A latch 40 is pivotally mounted within the receiving room 30 and includes in a rear region 41 a latch slot 42 extending along the front-to-back direction with a transversely expansive loading zone 44. A pivotal shaft 46 is formed in a middle region of the latch 40, and a locking hook 48 is formed at a front end of the latch 40. The rear region 41 forms a curved or obliquely extending structure 43 functioning as a bias spring. In this embodiment, the latch 40 is made of plastic via an injection molding process so the thickness may vary along the front-to-back direction for complying with the limited space of the receiving room 30 and the curved structure 43. An actuator 50 is positioned upon the latch 40 and includes around a front section a downward extending lug 52 assembled into the latch slot 42 via the expansive loading zone 44 and moveable along the latch slot 42. In this embodiment, because the actuator 50 is made of plastic via in an injection molding process, a pair of openings 54 are naturally formed in the actuator 50 in alignment with the two opposite transverse side portions 56 of the lug 52 along a vertical direction. A metallic cover 60 is assembled, via screws 62, to the upper case 112 to hold the latch 40 and the actuator 50 in position without upward withdrawal from the receiving room 30. The cage 500 forms a locking hole 502 with a rubber ring 504 surrounding the periphery of the locking hole 502.

In operation, the latch 40 is generally in a preloaded/tensioned manner with the locking hook 48 upwardly extending into and received within the locking hole 502 so as to assure the electrical cable connector 100 will not be incautiously withdrawn from the cage 500 in a locked status. In opposite, by backward movement of the actuator 50 via an manual operation, two side portions 56 of the lug 52 upwardly urge the underside of the curved structure 43 of the latch 40 so as to have the locking hook 40 downwardly moved due to the rotation about the pivotal shaft 46, thus leaving the locking hole 502 to allow the whole cable connector 100 to be withdrawn from the cage 500. Once the rearward pulling force is no longer applied upon the actuator 50, the actuator 50 may resume to its original/front position relative to the latch 40 due to the biasing force derived from the curved structure 43. Understandably, if required, an additional coil spring (not shown) may be provided in the latch slot 42 to abut against a rear end of the lug 52 so as to provide a spring force to urge/assure the lug 52 back to the front position with regard to the latch 40 after the rearward force is no longer applied upon the actuator 50.

Figure 26:
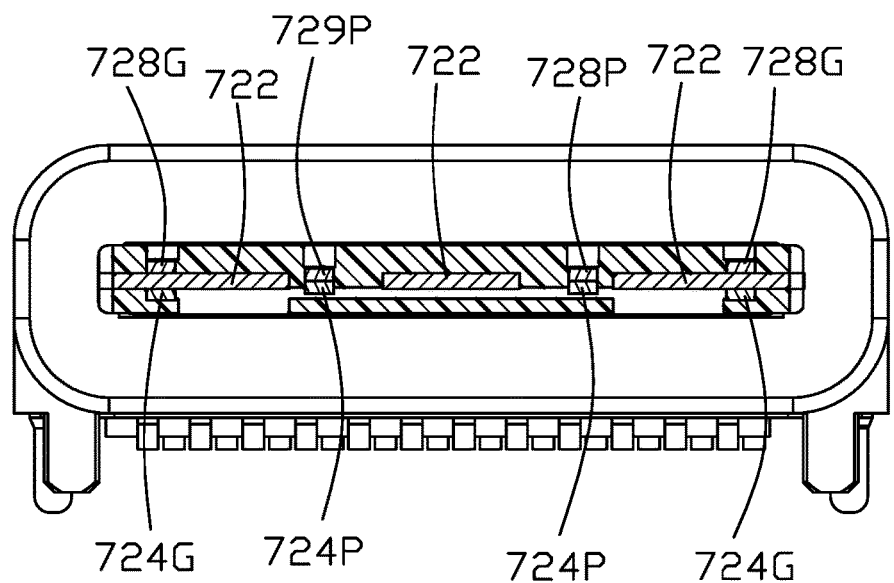
FIG. 26 is a partial cross-sectional view to show the receptacle connector of FIG. 10 in which the power contacts of the upper contacts and the lower contacts are mutually connected to each other and the grounding contacts of the upper contacts and the lower contacts are connected to the shielding plate.

FIGS. 10-15(B) show a modified receptacle connector 700 to the standard Type C connector mounted upon a printed circuit board 900. The receptacle connector 700 includes a terminal module 710 enclosed within a metallic shield 750. The terminal module 710 includes a basic unit 720 which is essentially composed of a metallic shielding plate 722 and a plurality of lower contacts 724 commonly integrally formed with an insulative base 726 via a first insert-molding process. A plurality of upper contacts 728 are further positioned upon the basis unit 720 and commonly successively integrally formed with an insulator 730 to form the whole terminal module 710 via a second insert-molding process. The shield 750 defining a receiving cavity 760 in which the mating tongue 711 of the terminal module 710 extends, includes a pair of securing tabs 752 engaged within a pair of corresponding recesses 732 to be assembled upon the terminal module 710, and a pair of spring fingers 754 extending into the receiving cavity 760 for engagement with the corresponding recesses 824 of the cable connector 800 (illustrated later). The shield 750 further includes two pair of legs 756 mounted into the corresponding holes 902 in the printed circuit board 900. Notably, compared with the traditional Type C receptacle connector which forms capsular cross-section of the mating port or receiving cavity with two semi-circles at two opposite ends along the lengthwise direction, the feature of the invention is to provide the cross-section of the receiving cavity with a one quadrant and a chamfer at the lengthwise end to replace the semi-circle thereof. Understandably, the chamfer is optionally of forty-five degrees while in this embodiment it is about 55 degrees. In this embodiment, as shown in FIG. 26, the power contact 728P of the upper contacts 728 and the power contacts 724P of the lower contacts 724 are mechanically and electrically connected to or abut against each other for implementing superior power transmission, and the grounding contacts 728G of the upper contacts 728 and the lower grounding contacts 724G of the lower contacts 724 are mechanically and electrically connected to or abut against the upper and lower surfaces of the shielding plate 722 for implementing superior shielding effect.

Referring to FIGS. 16-20(B), the cable connector 800 which is adapted to be mated with an electrical receptacle connector 950, which is very similar to the receptacle connector 700, as shown in FIGS. 21-26, includes a mating member 810 essentially composed of an insulative housing 820 enclosed within a metallic shell 830. The housing 820 forms a mating cavity 822 for receiving the mating tongue of the receptacle connector with upper and lower terminals 832 respectively located in the corresponding passageways 828 in the housing, which are formed by two sides of the mating cavity 822 and spaced from each other in the vertical direction. A pair of recesses 824 are formed in the housing 820 for receiving the corresponding spring fingers 954 during mating. A pair of insulative films 826 cover the passageways 828 in the vertical direction for preventing shorting between the upper and lower terminals 832 with the shell 830 when the upper and lower terminals 832 are connected to the corresponding upper and lower contacts 728 and 724 during mating. An insulative spacer 840 is located behind the housing 820 for regulating tails of the upper and lower terminals 832 for mechanically and electrically connecting to the corresponding wires 850 of the cable 860 which extending rearward from the housing 820. An overcoat 870 is applied upon the connection region between the mating member 820 and the cable 860 for protection and holding consideration. The shell 830 forms a pair of through holes 834 in aligned with the corresponding recesses 824 for receiving the corresponding spring fingers 954, respectively.

Figure 27:
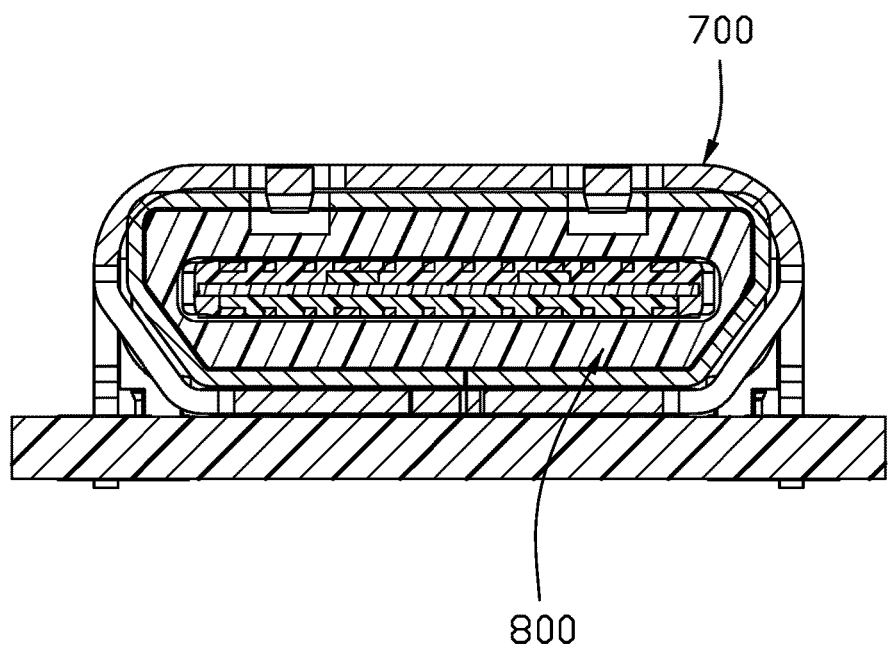
FIG. 27 is a cross-sectional view to show the cable connector of FIG. 16 and the receptacle connector of FIG. 10 with some interference during mating.
Figure 28:
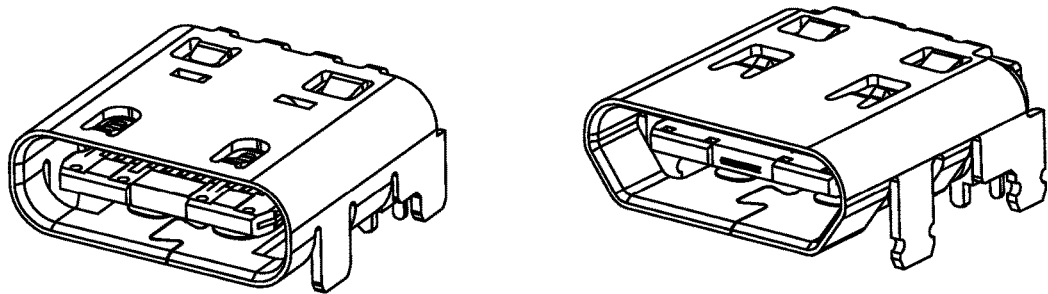
FIG. 28 shows the Type C receptacle connector and the receptacle connector of FIG. 10 in a comparison manner.
Figure 29:
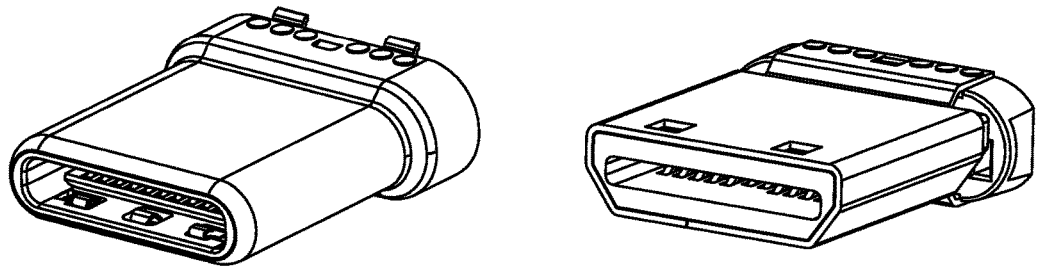
FIG. 29 shows, in a comparison manner, the Type C cable connector and the cable connector which is very similar to the cable connector of FIG. 16 and has an exterior periphery to fully comply with an interior periphery of the receptacle connector of FIG. 10.

Notably, in this embodiment the exterior contour of the mating member 810 forms a right angle structure and a chamfered structure at each lengthwise end which is different from the interior periphery of the receiving cavity 760 around two opposite lengthwise ends because the receiving cavity 760 forms one quadrant structure plus one chamfered structure at each lengthwise end. Therefore, in this embodiment, the corresponding receptacle 950 forms a slightly outwardly expansive curved structure on the quadrant structure for complying with the right angle structure of the mating member 810 of the cable connector 800. FIG. 27 shows the possible interference between the cable connector 800 and the receptacle connector 700 during mating if the clearance between the mating is relatively smaller. FIGS. 28 and 29 show the receptacle connector 700 and the fully compliant cable connector which are adapted to be mated with each other.

It can be understood that on one hand the cable connector 800 is configured/dimensioned not to be mated with the Type C receptacle connector and on the other hand the Type C cable connector also can not be mated within the receptacle connector 950 even though the tongue portion of the Type C receptacle connector (the mating cavity of the Type C cable connector) and the tongue portion of the receptacle connector 950 (the mating cavity 822 of the cable connector 800) share the same configuration and/or dimension with each other. It is also noted that the cross-section of the configuration of the shell 830 is very close to that of the micro USB used in the cellular phone. Anyhow, the mating cavity 822 of the cable connector 800 is essentially located in a middle level of the whole connector housing with the insulative housing isolated from the shell in the vertical direction while the mating cavity of the micro USB cable connector is located in an upper portion of the connector and exposed to the shell upwardly without protection by the housing.

It is to be understood, however, that even though numerous characteristics and advantages of the present invention have been set fourth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the members in which the appended claims are expressed. For example, in another embodiment to replace the first embodiment, the curved structure may be formed upon the front region/the lug of the actuator rather than on the rear region of the latch, to lift up the rear region of the latch for having the latch pivoted and having the locking hook downward moved in a similar operation way. Also, both the rear region of the latch and the front region of the actuator may be equipped with the curved structures for smoothing relative movement between the latch and the actuator during rearward movement of the actuator. Also, understandably in the first embodiment, the curved structure maybe refer to essentially an obliquely extending structure extending either curvedly or linearly/angularly. For the second embodiment, the feature of the invention provides the same maximum lengthwise dimension and same maximum vertical direction with the standard type C connector assembly on the mating port while defining a distinguishable configuration to only allow one orientation, compared with dual/flippable orientations of the type C connector assembly, during mating without risks of mistaken interchangeability with the type C connector assembly.

What is claimed is:

1. An electrical cable connector assembly comprising:
    a metallic cage defining a receiving space under a top wall, and a locking hole formed in the top wall and downwardly facing the receiving space in a vertical direction;
    an electrical cable connector including:
    a case defining a front receiving cavity and a rear receiving cavity along a front-to-back direction perpendicular to said vertical direction;
    a receiving room formed in an upper face of the case;
    a latch pivotally mounted to the upper face and disposed in the receiving room, and defining a front region, a rear region and a middle region between the front region and the rear region in the front-to-back direction;
    a pivot axis located in said middle region of the latch and extending along a transverse direction perpendicular to both said vertical direction and said front-to-back direction;
    an upward locking hook formed on said front region of the latch;
    an obliquely extending structure formed on the rear region; and
    an actuator being back and forth moveable along the front-to-back direction, positioned upon the latch and having a lug engaged with the latch; wherein when the electrical cable connector is received within the receiving space, the locking hook is engaged within the locking hole; when said actuator is rearwardly moved, the lug upwardly urges the obliquely extending structure to have the latch pivot about the pivot axis and have the locking hook downwardly move to leave the locking hole, thus allowing withdrawal of the electrical cable connector from the cage; and
    said latch forms a latch slot extending along the front-to-back direction, and said lug extends downwardly through the latch slot and moveable along said latch slot.

2. The electrical cable connector assembly as claimed in claim 1, wherein said latch forms a pair of pivotal shaft to define said pivot axis.

3. The electrical cable connector assembly as claimed in claim 1, wherein a printed circuit board is located in the front receiving cavity, and a cable having a plurality of wires disposed in the rear receiving cavity.

4. The electrical cable connector assembly as claimed in claim 1, wherein said obliquely extending structure extends either curvedly or linearly.

5. The electrical cable connector assembly as claimed in claim 1, wherein said lug is located at a front region of the actuator.

6. The electrical cable connector assembly as claimed in claim 1, wherein said lug forms two opposite transversely extending side portions respectively abutting against an underside of the obliquely extending structure of the latch.

7. The electrical cable connector assembly as claimed in claim 6, wherein the latch slot defines transversely expansive loading zone, the two opposite transversely extending side portions of the lug assembled into the latch slot via the expansive loading zone.

8. The electrical cable connector assembly as claimed in claim 6, wherein said actuator forms two through holes in alignment with the corresponding side portions of the lug, respectively, in the vertical direction.

9. An electrical cable connector assembly comprising:
a metallic cage defining a receiving space under a top wall, and a locking hole formed in the top wall and downwardly facing the receiving space in a vertical direction;
an electrical cable connector including:
a case defining a front receiving cavity and a rear receiving cavity along a front-to-back direction perpendicular to said vertical direction;
a receiving room formed in an upper face of the case;
a latch pivotally mounted to the upper face and disposed in the receiving room, and defining a front region, a rear region and a middle region between the front region and the rear region in the front-to-back direction;
a pivot axis located in said middle region of the latch and extending along a transverse direction perpendicular to both said vertical direction and said front-to-back direction;
an upward locking hook formed on said front region of the latch;
an actuator being back and forth moveable along the front-to-back direction, positioned upon the latch and having a lug engaged with the latch; and
a metallic cover assembled to the case to hold the latch and the actuator in position without upward withdrawal from the receiving room; wherein
an obliquely extending structure is formed on either a front region of the actuator or the rear region of the latch; and
when the electrical cable connector is received within the receiving space, the locking hook is engaged within the locking hole; when said actuator is rearwardly moved to have the lug urge the rear region of the latch upwardly, via the obliquely extending structure the rear region of the latch is upwardly lifted, the latch is pivoted about the pivot axis and the locking hook is downwardly moved to leave the locking hole, thus allowing withdrawal of the electrical cable connector from the cage.

10. The electrical cable connector assembly as claimed in claim 9, wherein said metallic cage comprises a rubber ring surrounding the periphery of the locking hole.

11. The electrical cable connector assembly as claimed in claim 9, wherein the metallic cover is assembled to the case via screws.

12. The electrical cable connector assembly as claimed in claim 9, wherein said obliquely extending structure is formed on the rear region of the latch.

13. The electrical cable connector assembly as claimed in claim 12, wherein said obliquely extending structure extends curvedly.

* * * * *